(12) United States Patent
Gallusser et al.

(10) Patent No.: US 12,393,956 B2
(45) Date of Patent: Aug. 19, 2025

(54) SCORING AND RECOMMENDING A MEDIA FILE

(71) Applicant: Disney Enterprises, Inc., Burbank, CA (US)

(72) Inventors: Fabian L. Gallusser, Palo Alto, CA (US); Lian Jian, San Jose, CA (US)

(73) Assignee: Disney Enterprises, Inc., Burbank, CA (US)

( * ) Notice: Subject to any disclaimer, the term of this patent is extended or adjusted under 35 U.S.C. 154(b) by 151 days.

(21) Appl. No.: 17/938,252

(22) Filed: Oct. 5, 2022

(65) Prior Publication Data

US 2024/0119468 A1   Apr. 11, 2024

(51) Int. Cl.
 *G06Q 30/0201*   (2023.01)

(52) U.S. Cl.
 CPC .............................. *G06Q 30/0201* (2013.01)

(58) Field of Classification Search
 CPC ................................................. G06Q 30/0201
 See application file for complete search history.

(56) References Cited

U.S. PATENT DOCUMENTS

| | | | |
|---|---|---|---|
| 8,995,815 B2* | 3/2015 | Maharajh | G06Q 10/10 386/205 |
| 9,015,736 B2* | 4/2015 | Cordray | H04N 21/4751 725/17 |
| 9,069,771 B2* | 6/2015 | Shustef | G06F 16/683 |
| 9,215,423 B2* | 12/2015 | Kimble | H04N 21/6582 |
| 9,473,730 B1* | 10/2016 | Roy | H04H 60/33 |
| 9,754,307 B2* | 9/2017 | Veugen | G06Q 30/0641 |
| 10,516,906 B2* | 12/2019 | Arpteg | G06N 20/00 |
| 11,012,749 B2* | 5/2021 | Kimble | H04N 21/25891 |
| 11,282,123 B2* | 3/2022 | Dietz | G06Q 30/0255 |
| 11,604,798 B2* | 3/2023 | Ghoshal | G06F 40/247 |
| 12,008,626 B1* | 6/2024 | Levy | G06N 20/00 |
| 2015/0020126 A1* | 1/2015 | Kegel | H04N 21/4667 725/87 |
| 2017/0195731 A1* | 7/2017 | Girlando | H04N 21/4312 |
| 2017/0238056 A1* | 8/2017 | Greene | G06F 16/7837 725/131 |
| 2018/0025005 A1* | 1/2018 | Cao | H04L 67/535 707/734 |
| 2018/0084306 A1* | 3/2018 | Hunter | H04N 21/25808 |
| 2020/0143448 A1* | 5/2020 | Steck | G06N 3/08 |
| 2020/0193472 A1* | 6/2020 | Volk | G06Q 30/0242 |
| 2022/0101157 A1 | 3/2022 | Huck et al. | |

(Continued)

OTHER PUBLICATIONS

Michelle Hawley, "Adobe Files Patent for AI-Powered 'Diversity Auditing' System," reworked, Dated: Sep. 5, 2023, pp. 1-8.

*Primary Examiner* — Dylan C White
(74) *Attorney, Agent, or Firm* — Patterson + Sheridan, LLP; Gero G. McClellan; Carleton S. Clauss

(57) ABSTRACT

Embodiments provide for parsing a media file using a factor of interest, determining a factor score for the media file, and performing a scored action based on the factor score to provide a media content recommendation to a user/consumer or to content providers. The scored action may include sorting and filtering a media repository, including the media file, which in turn reduces an amount of data needed for a system to provide an objective recommendation to a user, as well as reducing the time and data processing required to provide a recommendation to the user.

18 Claims, 12 Drawing Sheets

(56) References Cited

U.S. PATENT DOCUMENTS

2023/0267764 A1    8/2023  Tanjim et al.
2023/0388596 A1*  11/2023  Bhattacharya ..... H04N 21/4826
2023/0401604 A1*  12/2023  Singh .................. G06F 16/9538

* cited by examiner

SCORING AND RECOMMENDING A MEDIA FILE

BACKGROUND

The entertainment industry is increasingly moving towards providing media content directly to individual consumers via streaming services and other direct to consumer methods. As a part of this transition, the amount of digital content available to consumers is also rapidly increasing. This digital content includes content created for mass market appeal, where the content is intended for consumption across large populations, such as an entire country or consumers around the world. Other digital content includes content created for more niche market subsets of consumers, where the content may be readily enjoyed by some consumers, but less enjoyed by others.

Entertainment companies and other media content creators increasingly own and generate large amounts of media content across many different genres and media formats. The general goal of these companies and creators is to provide the media content to consumers for media consumption (e.g., viewing, listening, reading, etc.). As the media content landscape grows and the amount of digital content increases, the owners, creators, producers, reviewers, etc. (herein stakeholders) of the media content desire to understand what content currently exists in various media libraries, what current media content consumers want to consume, and what media content should be created to match consumer expectations for the future Content creators, providers, and consumers all desire for more efficient ways to both understand what content is available in the market for consumption, as well as what content should be made in the future. Methods for recommending content to individual consumers as well as for understanding what additional content should be made or otherwise provided currently relies on large amounts of data collection and analysis. This data collection tracks individual and group consumer usage of the media content and uses that data to provide additional content to the consumer. Less intrusive and more objective methods for evaluating and recommending media content remains a challenge.

While some media content providers have sophisticated systems for providing user's recommended content, these systems largely rely on large scale and intrusive data collection for both individual users and aggregate users across a given platform. For example, a user's habits for an individual movie in a media content library may indicate that the user enjoys watching the individual movie and similar movies. These previous methods use that data for the user to recommend other nominally similar media content based on other user's watching habits. For example, User A views titles A, B, and C and when User B views title A, the previous methods recommend titles B and C to User B (based on User A's history). However, these current recommendation methods rely on observing user behavior and are limited in the insights that can be gained for media content.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

The system of the present disclosure allows media content owners and providers to gain insight into how well their media libraries represent a diversity of populations along a variety of characteristics and metrics. For example, an individual movie, or a group of movies taken as a collection, may over-represent or under-represent various demographic groups (as compared to a general or target population). Similarly, media content may present various other experiences across economic, technological, and sociological spectrums.

Understanding what the media content provides or presents to a consumer allows for more nuanced and targeted recommendations for users, as well as providing insight to content creators on what new media content or changes to existing media content should be made to address gaps in representation. Filling these gaps of representation in media content can improve a general reputation for the media content and the media content providers/creators. This can also encourage engagement with the media content and increase consumption of the media content as well as profit for the media content providers/creators.

In order to address these concerns and provide nuanced insight into media content, the systems and methods described herein provide for parsing a media file using a factor of interest, determining a factor score for the media file, and performing a scored action based on the factor score to provide a media content recommendation to a user/consumer or to content providers. The scored action may include sorting and filtering a media repository, including the media file, which in turn reduces an amount of data needed for a system to provide an objective recommendation to a user, as well as reducing the time and data processing required to provide a recommendation to the user.

Figure 1:
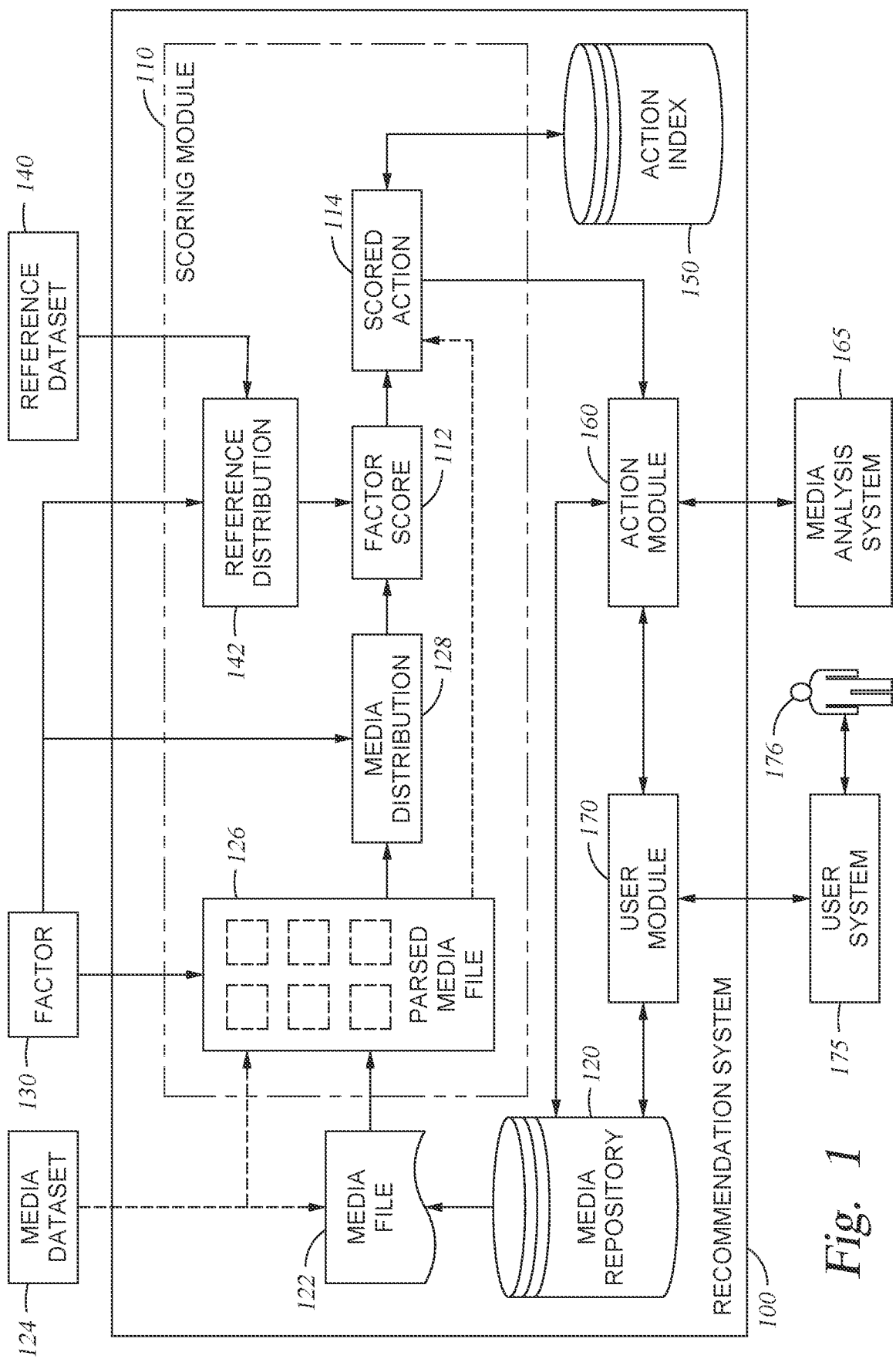
FIG. 1 depicts a recommendation system for scoring a media file, according to embodiments described herein.

FIG. 1 depicts a recommendation system, system 100, for scoring a media file, according to embodiments described herein. The system 100 scores a media file 122 and provides for improved sorting and filtering of a media repository 120. The system 100 may also provide recommendations related to the media file 122 to external systems, such as a user system 175 and a media analysis system 165, as discussed herein.

In some examples, the media file 122 may contain any combination of digital media including video media, audio media, text based media, etc. For example, the media file 122 may be a video content file stored in the media repository 120, where the media repository 120 is a video content library or catalogue of video titles generally accessible by a user 176 via the user system 175 and a user module 170. In this example, the video content file includes any of a movie, an episode of a television show/feature, a music video, short form video, and other video content.

The user module 170 may filter, select, and otherwise recommend media selections from the media repository 120 for the user 176 to consume. For example, the user module 170 selects video content from the media repository 120 for the user 176 to view (e.g. via a display associated with the user system 175). In some examples, the user 176 may seek access to a media file 122 in the media repository 120 such as via a search function via the user module 170 and the media repository 120. The user module 170 and the media repository 120 utilize the search function to directly filter or select the desired media file and provide the media file 122 to the user 176 via the user system 175. For example, when the user 176 has a specific movie they desire to watch, the system 100 permits the user 176 to directly access and view the specific movie. While the user 176 may continue direct access to the system 100, the stakeholders in the system 100 often want to encourage engagement between the user 176 and the system 100. The engagement can be increased when the user 176 is informed about other media in the media repository 120 that may be of interest to the user 176.

For example, the system 100 may recommend additional media files in the media repository 120 that the user 176 may find interesting or worth consuming, and in turn, continue to access the system 100. In some examples, the media repository 120 includes a large catalogue of media files, where some media files (e.g. video content) are relevant to the user 176 (e.g., the user desires to view the content or would likely enjoy viewing the content) and other media files are less relevant or less interesting to the user 176. Relying on the user 176 to manually sort through the media repository 120 for relevant media may fatigue the user 176 and reduce engagement with the system 100. Moreover, collecting search and interaction data related to the user's interactions with the system 100 can raise data privacy concerns as well as necessitate some baseline user engagement with the system in order to collect at least some interaction data.

In order for the system 100 and the user module 170 to efficiently provide relevant media files (e.g., video content) to the user 176, the media files (such as the media file 122) in the media repository 120 are scored and filtered according to various factors of interest, discussed herein, where the filtered media repository provides filtered media to the user upon access by the user. While various examples discussed herein are related to video content files, as discussed above the media file 122 may be any type of media or other data file which contains scorable information. For example, the media file 122 may include any combination of a still image, a digital book, an audio recording, or other type of media content. The system 100 parses and scores each of these various types of media to provide a recommendation to the user 176 and the media analysis system 165.

In some examples, a scoring module 110 of the system 100 obtains or accesses the media file 122 from the media repository 120. The scoring module 110 parses the media file 122 into the parsed media file 126 for tagging and further scoring. The scoring module 110 may use a media dataset 124 and a factor of interest 130 to parse the media file 126 into scoring elements, as discussed in greater detail in relation to FIG. 2.

The media dataset 124 may include data relevant to the media file 122. For example, for a video content file, such as a movie, the media dataset 124 may include a script, actor credits for the movie, as well as demographic and other relevant information for each actor, etc. If the actor information contains personally-identifiable or other sensitive information, it must be gathered, handled, secured, and used in strict compliance with all data and privacy laws and best practices of the relevant jurisdiction. In some examples, the media dataset 124 may be included as a part of the media file 122 (e.g., data, metadata, etc.). For example, previously applied tags or other similar information data may be included as part of the media file 122, where the previously applied tags contain information relevant to the factor of interest. For example, previously applied tags for a video content file may include tags for media genre, demographic and other representational characteristics of lead actor(s), characteristics of supporting actor(s) (demographic and other representational characteristics, as well as relevance to plot, screen time, etc.).

The media dataset 124 may also include data accessible via an external network, such as the Internet, where the system 100 accesses the information from public or private databases via the external network, as the scoring module 110 parses the media file 122. For example, the media dataset 124 may include data collected by the system 100 from external databases that include actor information for a movie including demographic information for the actor, past roles, etc.

In some examples, the scoring module 110 also uses the factor of interest 130 to parse the media file 122. The factor of interest may include any combination of factors and dimensions relevant to a user 176 or to the stakeholders of the system 100. For example, the factor of interest 130 may include association with one or more groups. Furthermore, each factor of interest includes dimensions or values of the factor.

Additionally, the factor of interest may include any combination of representational interests which may or may not be represented in the media file 122. Representational interests may include demographic interests which include, but are not limited to race, age, ethnicity, education level, employment status, income, gender, sex, additional biological traits, disability status, height, body type, additional sociological traits, and other demographic measures which can be used to describe people. Other representational interests included in a factor of interest may include economic interests, technological interests, brand representation, product placement, story themes, set locations, and other example interests that may be represented in media files. Collection, handling, use, and documentation of such information should be done on purely voluntary basis, with consent clearly obtained and documented and processes used to ensure that all such information is secured and only used in strict compliance with all data and privacy laws and best practices of the relevant jurisdiction.

The scoring module 110 provides a factor score based on the data in the media file 122 (as compared to the reference dataset 140 described herein). For example, the factor score ultimately considers how often characters meeting a certain factor criteria are on screen in a movie, how often characters meeting the criteria speak in the dialogue, how the characters are represented in the movie (e.g., positive characterization vs negative characterization), among other factors.

These factors and the various dimensions associated with the factor are used determine what types of scoring elements are needed in the parsed media file 126 and to score the media file 122 as discussed herein in more detail in relation to FIGS. 2-7. The factor of interest 130 may also include limiting factors or dimensions individually selected by a user 176.

In general, the media file 122 is also parsed to apply tracking tags to the various instances of the parsed media file 126 which relate to a respective dimension/value of the factor of interest 130. For example, whenever a dimension of the factor of interest 130 is detected or associated with a portion of the media file 122, the scoring module 110 applies a tracking tag for the dimension. The scoring module 110 aggregates the applied tracking tags for the parsed media file 126 and generates a media distribution 128 for the media file 122. The media distribution may include any type of distribution function or representation which represents the factor of interest and the related dimensions in the media file 122. For example, the media distribution 128 may include a discrete distribution of the tracking tags applied to the parsed media file 126.

The scoring module 110 also generates a target or reference distribution, such as a reference distribution 142 using reference dataset 140. In some examples, the reference dataset 140 may include publicly accessible demographic data such as census data, population survey data, governmental records, etc. and must be must be gathered, handled, secured, and used in strict compliance with all confidentiality restrictions, data and privacy laws, and best practices of the relevant jurisdiction. The reference dataset 140 may also include limited or private datasets which include information and data related to the scoring of media files. The reference dataset 140 may also include a target dataset for the media file 122 as selected by the operator of the system 100. For example, the scoring module 110 scores the media file 122 against a target or goal dataset (e.g., scored against a goal representation). In some examples, the reference dataset 140 may be pre-trimmed where the data in the dataset is specifically selected for scoring the media file 122 using the factor of interest (e.g. data is directly related to the dimensions of the factors of interest).

While referred to herein as a single dataset, the reference dataset 140 may include multiple datasets from across multiple sources. For example, the reference dataset 140 may include reference media, where the scoring module 110 scores the media file 122 against the reference media file or reference media library (e.g., the media file 122 is scored against every other media file in a media library or media libraries). In some examples, scoring the media file against a reference dataset 140 that includes demographic information for a population may provide advantageous insight into how the media file 122 represents the population, but may not represent other populations or a global population. Reference dataset 140 may have different subsets representing different markets, or there may be more than one reference dataset 140 representing different markets. A media file may score high with respect to one market and low with respect to another market. Scoring the media file 122 against a media catalog (e.g., the media repository 120 or other collection of media content) provides for insight into how the media file 122 scores against currently available media content.

In another example, the scoring module 110 parses or otherwise processes the reference dataset 140 using the factor of interest 130 to extract and tabulate data related to the dimensions. The scoring module 110 also uses the extracted relevant data and the factor of interest 130 to generate a reference distribution 142. The reference distribution 142 may include any type of distribution function or representation which represents the factor of interest and the related dimensions in the reference dataset 140. In some examples, the reference distribution 142 is a same form of distribution as the media distribution 128 (e.g., both are discrete distributions).

The scoring module 110 uses the media distribution 128 and the reference distribution 142 to determine a factor score 112 for the media file 122. The factor score 112 indicates how well the media file 122 matches or otherwise relates to the reference dataset 140 based on the factor of interest 130. In some examples, the factor score 112 is within a range from (0)-(100) where (0) indicates no relation, similarity, or match between the media file 122 and the reference dataset 140 and (100) indicates a perfect or near perfect match between the media file 122 and the reference dataset 140.

Additionally, the factor score 112 may be calculated by the scoring module 110 using normalized and aggregated versions of the media distribution 128 and the reference distribution 142. The scoring module 110 may also use distance calculations between the media distribution 128 and the reference distribution 142 in order to determine the factor score 112. The generation of the media distribution 128 and the reference distribution 142 and calculation of the factor score 112 are discussed in greater detail herein in relation to FIGS. 4A-D.

The scoring module 110 uses the factor score 112 to generate a scored action 114. In some examples, the scoring module 110 accesses or otherwise interacts with an action index 150 to generate the scored action 114. The scored action 114 includes actions for the system 100 to perform related to the media file 122. The action index may include stored discrete actions (e.g., provide a scored media file with a high score to a user, sort a scored media file with a low score to a bottom of a recommendation queue, etc.) where the scoring module 110 selects one of the stored discrete actions as the scored action 114 for the media file 122. The action index may also include various steps for generating an action based on the factor of interest 130, the media file 122, the media repository 120, the user 176, etc. For example, the scoring module 110 may select various sub-actions from the action index 150 to form the scored action 114.

In some examples, the system 100 stores the factor score 112 and the scored action 114 with a direct correlation to the media file 122 (e.g., as metadata for the media file 122). In some examples, the action module 160 executes, implements, or otherwise performs the scored action 114. For example, the action module 160 in conjunction with user module 170 filters the media repository 120 to sort or filter the repository in order to provide relevant media files to the user 176. For example, the action module 160 sorts the media file 122 and the media repository 120 to cause the media file 122 to be recommended to the user 176, hidden from the user 176, etc.

In some examples, the system 100 repeats the process of scoring the media file for each media file in the media repository 120 in order to score each media file according to the factor of interest 130 and the reference dataset 140. The user module 170 and the user 176 may then efficiently access the media repository where relevant, recommended media files are easily accessible by and provided to the user 176.

In some examples, the scored action 114 also includes suggestions, notes, or directives for the stakeholders or operator of the recommendation system. For example, when the media file 122 includes a low score for the factor of interest 130, the scored action 114 may include a low score alert for the media analysis system 165. The action module 160 provides the alert to the media analysis system 165 in order to inform the operator that the media file 122 has a low score for the factor of interest 130. The operator may then use the low score to alter the system 100, the media repository 120, the media file 122, etc. in order to raise the score for the media file 122 or an aggregate score for the media repository 120 overall.

In any example described above in relation to FIG. 1, the scoring of the media file 122 is directly related to the content presented in the media file. That is, the content that the user 176 is consuming or would ultimately consume (e.g., view, hear, read, etc.) via the user system 175. As discussed above, in order to score the media content and the media file 122 properly, the scoring module 110 parses the media file 122 into the parsed media file 126 as discussed in relation to FIGS. 2, 3A, and 3B.

Figure 2:
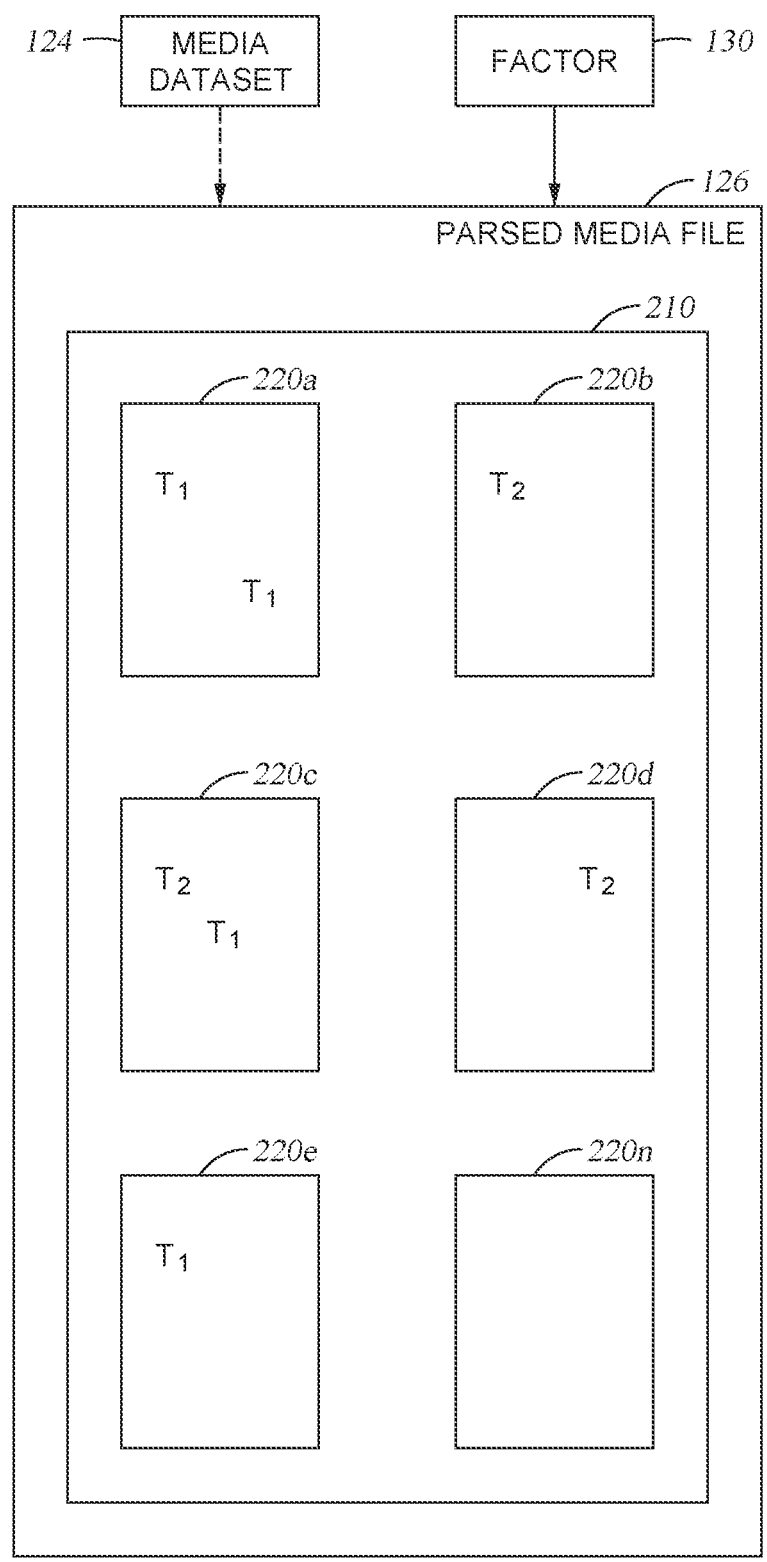
FIG. 2 illustrates a parsed media file, according to embodiments described herein.

FIG. 2 illustrates a parsed media file, according to embodiments described herein. The scoring module 110, discussed in FIG. 1, uses the media dataset 124 and the factor of interest 130 to parse the media file 122, shown in FIG. 1, into the parsed media file 126. In some examples, the scoring module 110 determines a scoring element structure 210 for the media file, where one or more parsing instances, including parsing instances 220a-220n are stored. The scoring element structure and the one or more parsing instances 220a-220n form a plurality of scoring elements for the media file 122.

For example, for a video content file, the scoring element structure 210 may include a container to collect the various relevant parts or scoring elements of a video content file, including the parsing instances 220a-n. The parsing instance 220a may include data related to the rendered images in the video file (e.g., what a user sees when viewing or watching the file). The scoring module 110 may populate the parsing instance 220a using video/image processing and other processes to include the data related to rendered images. The parsing instance 220b may include information related to words spoken in the video content file. The scoring module 110 may populate the parsing instance 220b from any of closed caption data from the media file 122, script data for the media file 122 (received from the media dataset 124), and speech recognition processes to derive the actual words communicated in the video content of the media file 122. The parsing instance 220c may include data related to sounds other than scripted words or speech, such as soundtrack, background noise, etc. from the media file 122. The other parsing instances 220d-220n may include other related data for parsing, classifying, and tagging the media file 122.

In some examples, the types of parsing instances are determined by the scoring module 110 based on the factor of interest 130. In one example, where the factor of interest 130 relates to demographics, the scoring module 110 scores the media file 122 based on the representation of the demographic dimensions in the media file, thus the parsing instances for video content may include parsing instances for rendered images and spoken words to capture representation of the demographic dimensions.

In another example, the factor of interest 130 relates to auditory dimensions (e.g., type of music or sounds), where the scoring module 110 scores the media file based on a certain type or category of music included in the video content of the media file 122. In this case, rendered images may not be necessary for determining the factor score, thus the scoring module 110 does not process the video content for rendered images.

In some examples, the parsing instances 220a-220n may be interrelated. For example, rendered images in parsing instance 220a may be related to words spoken in parsing instance 220b as well as the background or soundtrack playing during the video content stored in the parsing instance 220c. This example may be seen in video content where a character with demographic characteristics may be shown in the rendered images of a scene, but has no dialogue or interaction with other characters. Thus, while represented in the rendered images, the character may not be fully represented in the video content since there is no engagement with the character beyond being in the background of the presented video content. These interrelations may then be used to adjust the applied tags and to calculate/update the factor described herein. These interrelations may be stored in the parsing instances themselves or as part of a separate parsing instance (e.g., the parsing instance 220e).

In some examples, the scoring module 110 applies tags to the parsing instances to represent the dimensions of the factor of interest 130 represented in the parsing instance. In some examples, the scoring module 110 utilizes a variety of processing methods including Machine Learning (ML) algorithms. The ML algorithms and other methods may include methods for video processing, image recognition, object identification, natural language processing, and other processes performed by the scoring module 110 to efficiently process the media file 126 and applies tags to the parsing instances.

In an example where the factor of interest 130 is a binary representation, the scoring module 110 applies a first tag $T_1$ to the parsing instances 220a, 220c, and 220e when a first dimension is present in the respective parsing instances. For example, the scoring module 110 detects a character of a certain type is depicted in the rendered images of the parsing instance 220a (using image recognition processes, accessing media dataset 124, etc.) and applies the first tag $T_1$ to the parsing instance 220a. The scoring module 110 detects the background music or soundtrack in the parsing instance 220c is composed, orchestrated, or performed by a musician having a similar characteristic (using sound recognition processes, accessing media dataset 124, etc.) and applies the first tag T1 to the parsing instance 220c. Furthermore, the scoring module detects a favorable or positive interaction for a character in the interactions of parsing instance 220e (using natural language processing for spoken words in the media file 122, ML gesture processing for rendered images, etc.), and applies the first tag $T_1$ to the parsing instance 220e.

In some examples, the scoring module 110 also applies a second tag (T2) for a second dimension of the binary representation to parsing instances 220b, 220c, and 220d. For example, the scoring module 110 detects a character of a certain type speaking in words spoken in parsing instance 220b and applies the second tag T2 to the parsing instance 220b as well as the instances 220c and 220d based on other detection processes related to the various parsing instances. In some examples, a parsing instance includes or represents several instances of the dimensions, where the scoring module 110 applies a tag multiple times to the parsing instance. For example, the parsing instance 220a includes the first dimension (e.g., two characters with the first characteristic) such that the scoring module 110 applies the first tag $T_1$ to the parsing instance at least twice. Parsing instances and related tags are described in more detail in relation to FIGS. 3A-3B.

Figure 3A:
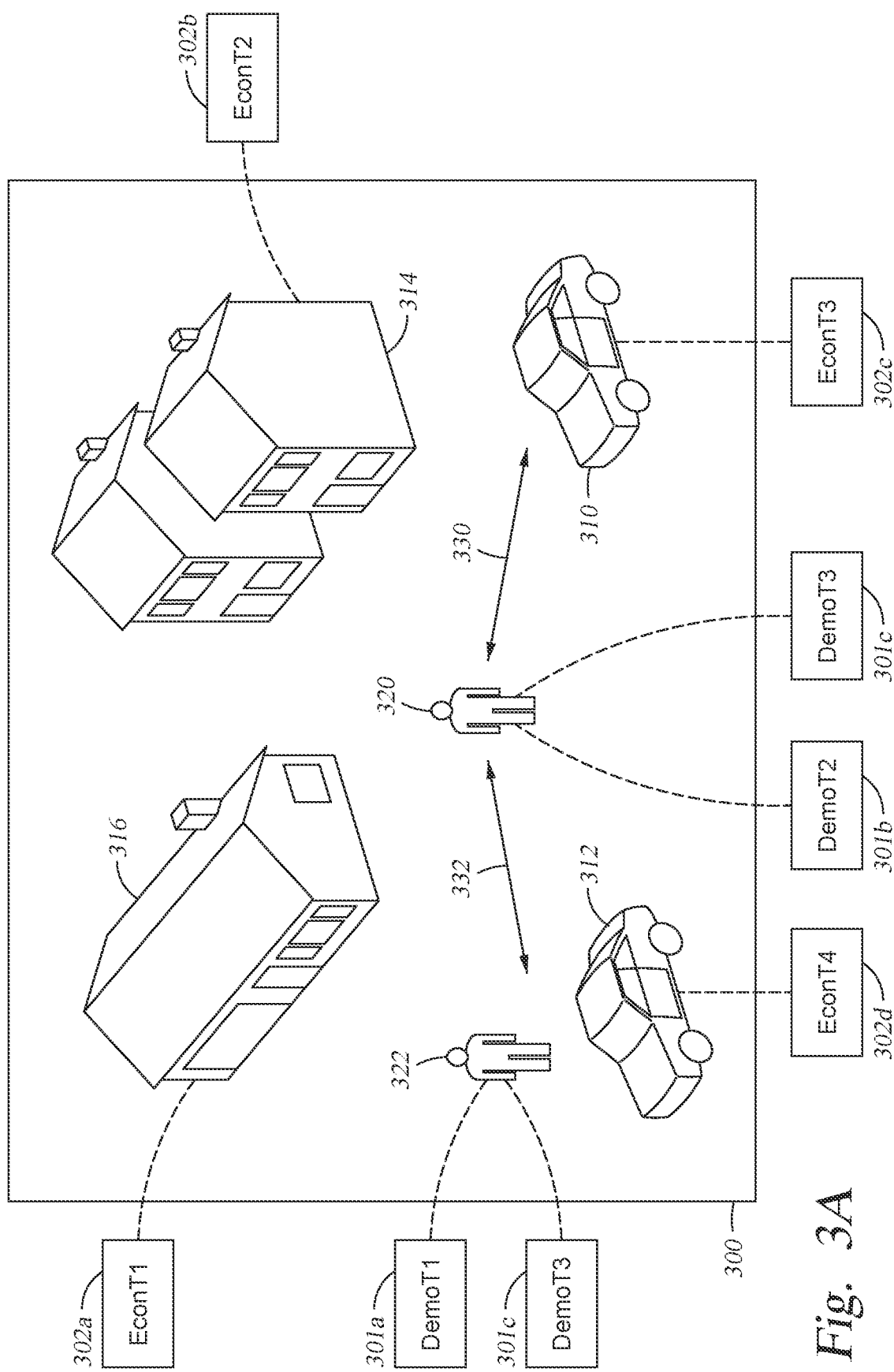
FIGS. 3A-B illustrate parsing instances, according to embodiments described herein.
Figure 3B:
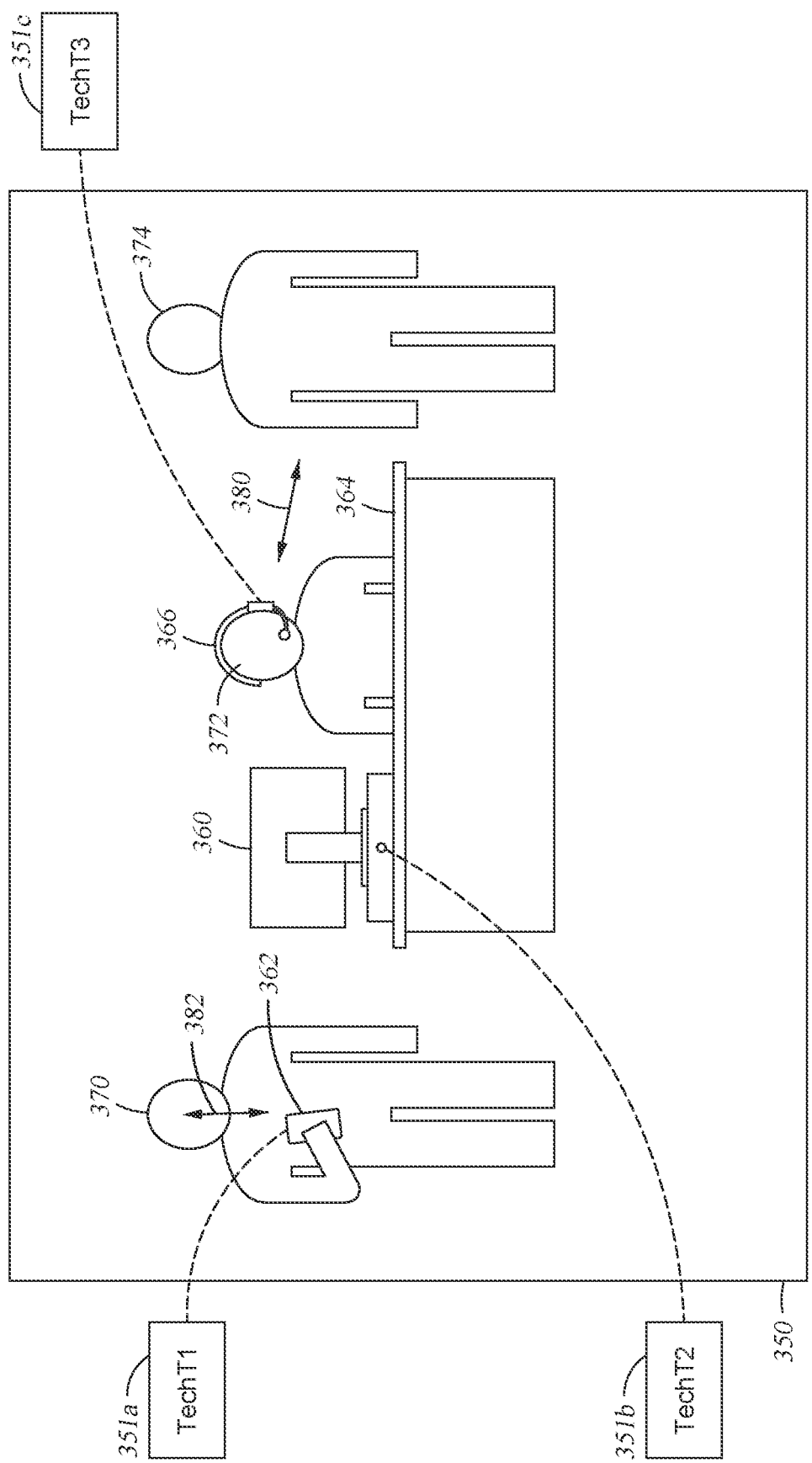

FIGS. 3A-B illustrate parsing instances, according to embodiments described herein. For example, FIG. 3A includes a parsing instance 300 which depicts at least one scene of video content. In some examples, the parsing instance 300 includes images rendered in the video content of the media file 122. For example, the parsing instance 300 includes objects 310, 312, 316, and 314 as well as person 322 and person 320. The parsing instance 300 also depicts interactions occurring in the video content. For example, the person 322 and the person 320 have an interaction 332 during the scene associated with the parsing instance 300. Additionally, the person 320 may also interact with the object 310 (e.g., a car) during the video content.

For the parsing instance 300, a factor of interest may include a demographic factor of interest with several demographic dimensions. As described in relation to FIG. 2, as the system processes the parsing instance 300 and the scoring module 110 applies tags related to the demographic dimensions using various ML learning and additional video processing methods.

For example, the scoring module 110 applies a first tag for the demographic dimension (DemoT1 301a) of a person to the parsing instance 300 when either the person 322 or the person 320 match the demographic dimension. In some examples, the scoring module 110 also determines whether the persons 320 or 322 match or represent a characteristic such as DemoT1 301a by video processing/image identification, information related to the characters/person (e.g., a character description for the persons 320 and 322) in the media file 122, information related to the actor/actress portraying the persons contained in the media dataset 124, etc. In an example where the person 322 matches the demographic DemoT1 301a, the scoring module 110 applies the DemoT1 301a to the parsing instance 300.

Additionally, the person 322 may represent a different dimension than the person 320, such that the scoring module 110 applies a second tag DemoT2 301b to parsing instance 300 to represent the different demographic dimension/characteristic.

In some examples, tags related to the first tag and the second tag may also be used to analyze and tag the interaction 332 (e.g., using text recognition and natural language processing for the dialogue, image processing to access physical aspects of the interaction, etc.). For example, additional tags DemoT1 301a or DemoT2 301b may be applied based on the dialogue in the interaction 332 or other measures that quantify which of the person 320 and 322 is represented by the interaction 332.

In some examples, the factor of interest 130 may also include an additional factor with additional dimensions. For example, the factor of interest may include an additional demographic of age group. In this example, a third tag DemoT2 301b may also be applied for both the person 320 and the person 322 when a third demographic dimension related to the factor of interest is shared by both persons 320 and 322. For example, the scoring module 110 detects, using the media dataset 124, image recognition, etc., that the persons 320 and 322 are a same or similar age (e.g., both 20 years old, both young adults, etc.) and applies the tag DemoT3 301c to the parsing instances. In this example, the multiple factors and the respective dimensions may be utilized in the generation of the factor score described herein.

For the tags 301a-301c, the factor of interest is related to demographic or other attributes of the characters depicted in the parsing instance 300. In some examples, the scoring module 110 may also apply tags to represent economic or other characteristics of things other than people depicted in the parsing instance 300, such as when the factor of interest 130 is related to economic or other factors.

For example, the scoring module 110 applies a first economic tag (EconT1 302a) when the object 316 is a single family home (representing a first economic dimension) and applies a second economic tag (EconT2 302b) when the object 314 is a multi-family home (representing a second economic dimension). Similarly, the scoring module 110 applies a third economic tag (EconT3 302c) and a fourth economic tag (EconT4 302d) to the parsing instance 300 to track the objects 310 and 312 respectively, where the objects 310 and 312 are cars representing different makes and model as well as age of the car etc. In some examples, the scoring module 110 uses image recognition as well as ML algorithms to detect a represented socio-economic class or status in the parsing instance 300, where the economic tags represent varying social classes (e.g., lower, middle, and upper classes, etc.).

Furthermore, in some examples the factor of interest may include several different factors of interest, including different types of factors of interest, combined to form a combined factor of interest and a combined factor score. For example, the demographic tags and the economic tags in the parsing instance 300 are aggregated and processed into a single media distribution. In another example, dimensions associated with just one factor are aggregated and processing into a media distribution, as described in greater detail herein in relation to at least FIG. 4A.

As described herein, the applied tags, related distributions, and factor scores for the demographic and economic concerns represented in the tags in parsing instance 300, provide objective insight into various sociological factors that may ultimately affect a user viewing the media file 122. However, the system 100 and the scoring module 110 also provides objective insights into additional factors of interest beyond demographic, economic, or sociological factors of concern.

For example, FIG. 3B includes a parsing instance 350 which depicts at least one scene of video content. In this example, the factor of concern may include interaction or product use/placement concerns, such as interactions and use of technology or other products. For example, persons 370, 372, and 374 may interact with objects 360, 362, 364, and 366. The objects 362, 360, and 366 may include technological or electronic devices where the scoring module 110 applies technological tags (TechT1 351a, TechT2 351b, TechT3 351c) to the parsing instance 350 when the objects are present in the parsing instances 350. The applied tags may also be updated based on interactions with the objects, such as interaction 382 between the person 370 and the object 362. The scoring module 110 may also update the technological tags based on an interaction 380 between the persons 374 and 372 if the object 366 or the object 360 are used or mentioned during the interaction 380.

Like the respective tags in the parsing instance 300 of FIG. 3A, the tags applied to the parsing instance 350 may be aggregated and compared to a reference dataset. This comparison may provide insight into technological uptake depicted in the media file 122 (e.g., the types of technology used and depicted). The tags in the parsing instance may also be used to analyze and determine additional dimensions, such as product placement (e.g., brands represented in the media file 122), among other scorable dimensions.

In both the parsing instance 300 in FIG. 3A and the parsing instance 350 in FIG. 3B, the scoring module 110 may use the applied tags, both in individual form (i.e. tags for one set of dimensions) as well as aggregated form (i.e. plurality of tags for one dimension or several dimensions) to determine a scored action directly. For example, referring back to FIG. 1 the scoring module 110 may utilize the parsed media file 126 directly to determine a scored action. For example, when the user 176 prefers to view media files that have a high representation of a certain factor of interest the number of tags for the certain factor of interest in the parsed media file (regardless of the comparison to the reference dataset) may indicate that the user 176 is interested in viewing the media file 122, where the system 100 recommends or otherwise provides the media file 122 to the user 176 via the user module 170 (as discussed herein).

With continued reference to FIG. 1, in some examples, a direct relation of the factor of interest 130 to the user 176 may not be clear to the system 100. For example, the user 176 may be a new user where past viewing behaviors and viewing preferences are not known to the system 100. Additionally, an operator of the system 100 may decline to collect usage and other data for the user 176 in order to provide data privacy to the user 176. Other examples, where the system 100 may not have a clear process to recommend a media file includes where the media file 122 is a new file (e.g., a new movie or T.V. show in a content library) or where the media repository 120 is a new media repository (e.g., a new or recently added content library). In each of these examples, the system 100 may require additional context for providing a recommendation to the user 176 and the media analysis system 165. In turn, the scoring module 110 generates the factor score 112 using the media distribution 128 and the reference distribution 142 as described in more detail in relation to FIGS. 4A-D.

Figure 4A:
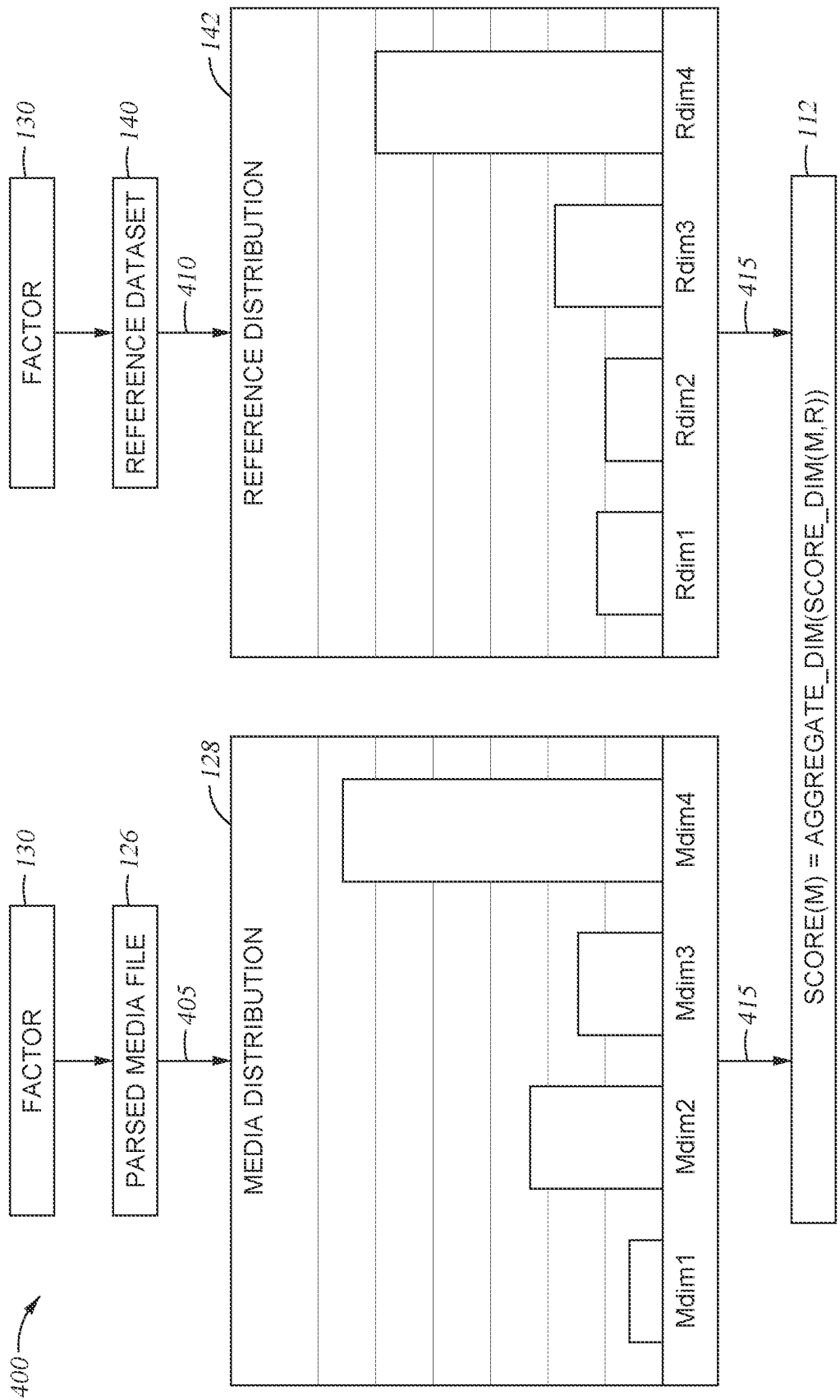
FIG. 4A is a system flow diagram for determining a factor score, according to embodiments described herein.
Figure 4B:
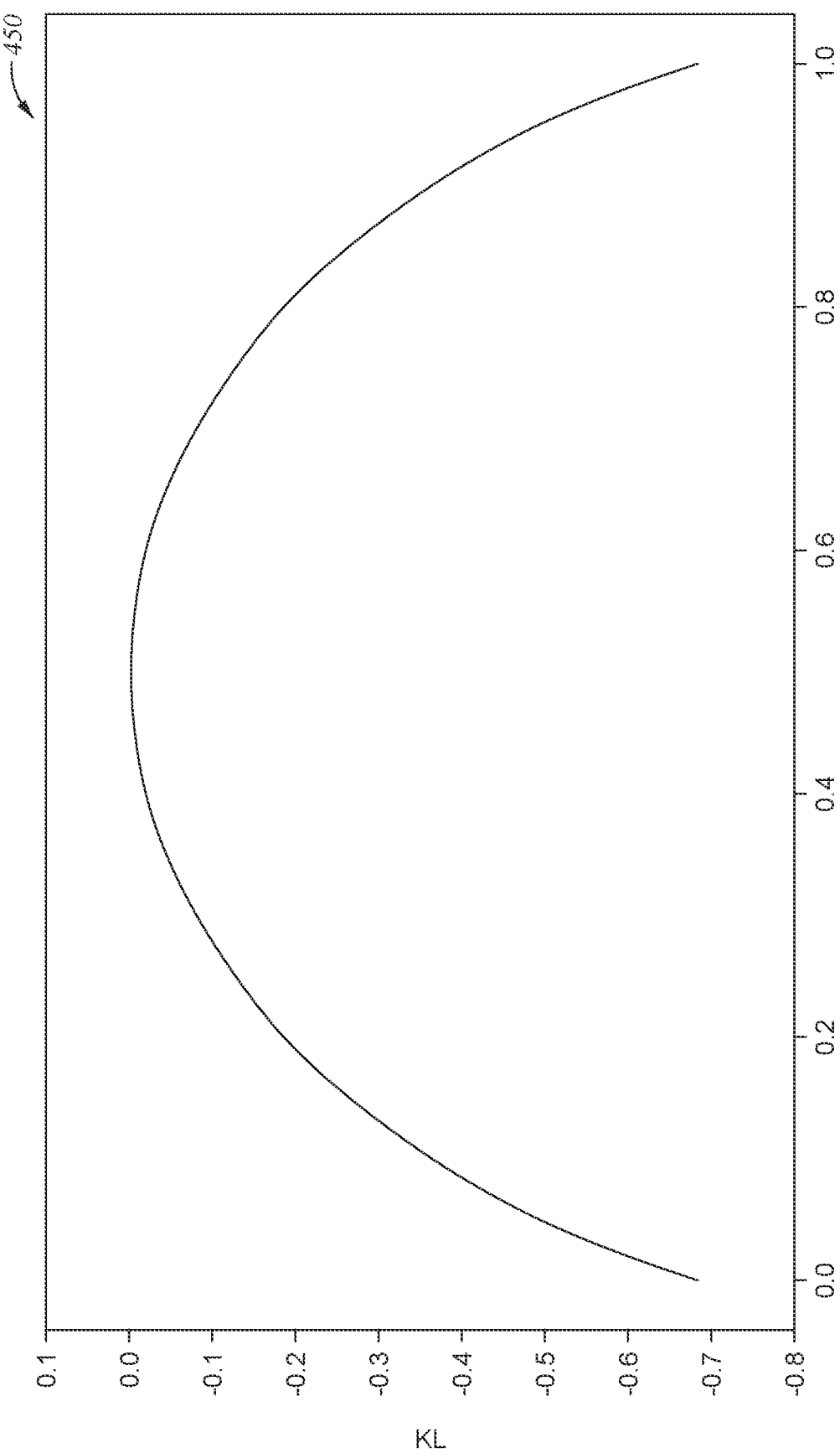
FIGS. 4B-D are example graphs for determining distance values, according to embodiments described herein.
Figure 4C:
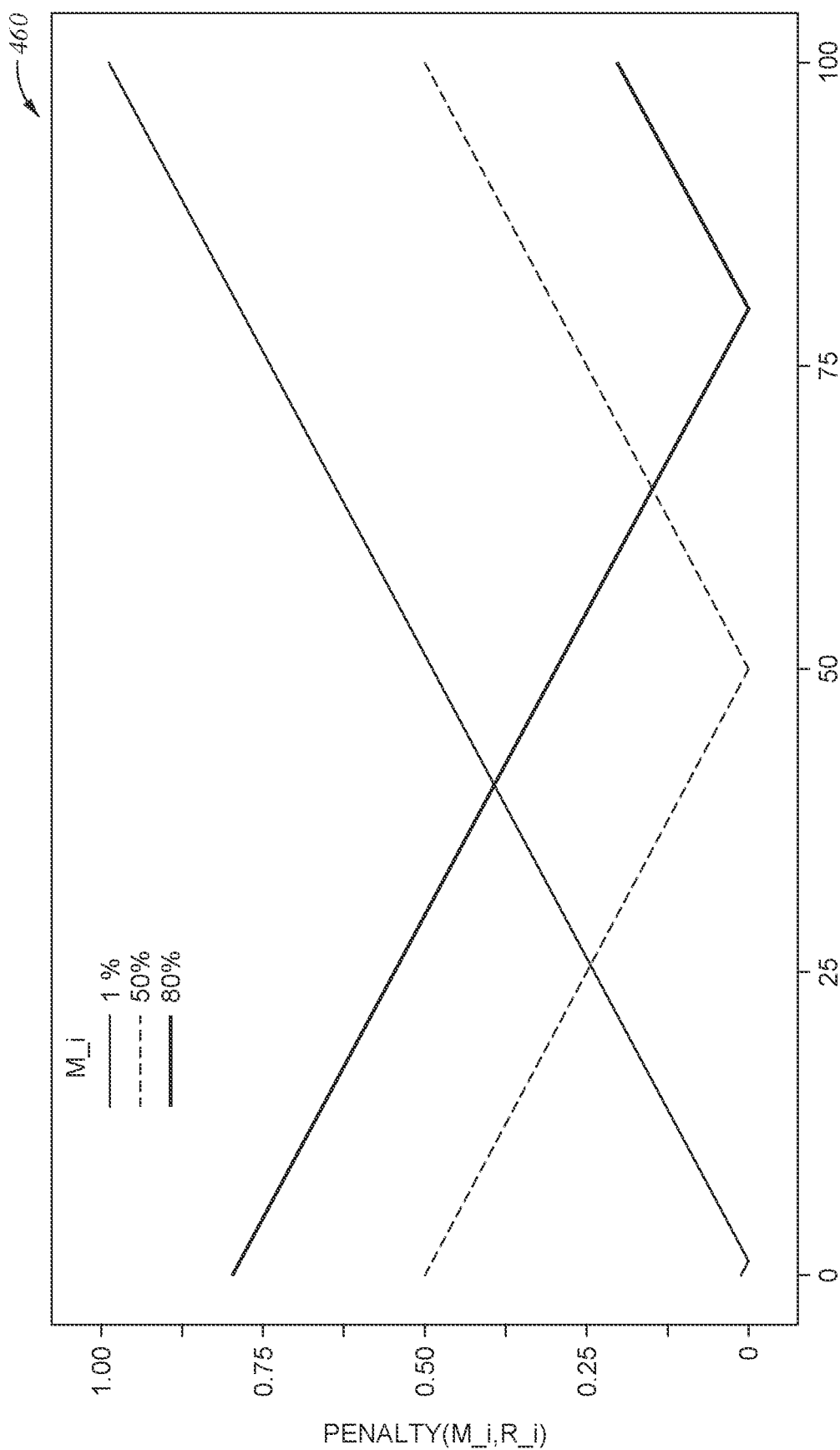
Figure 4D:
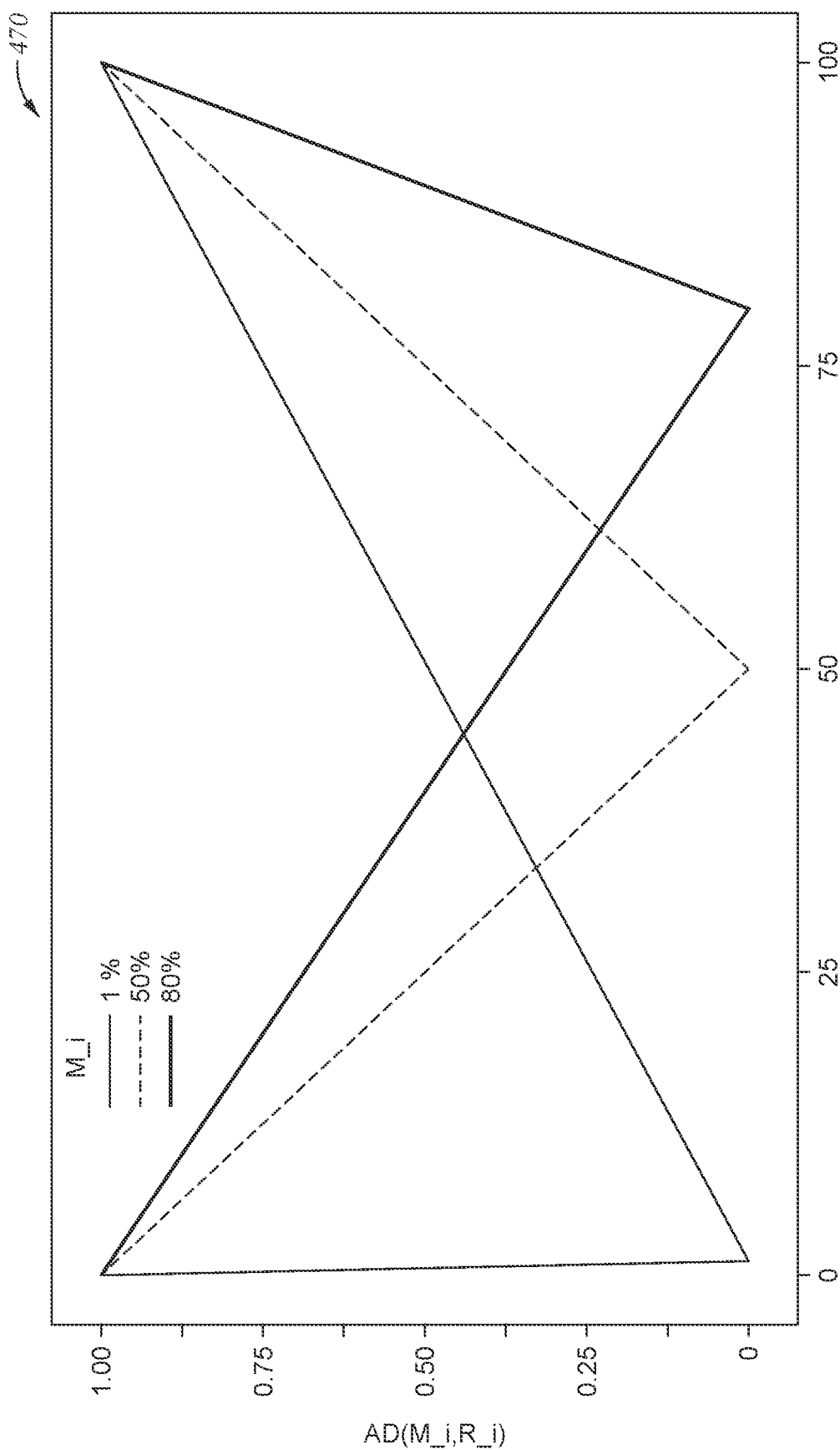

FIG. 4A illustrates a system flow 400 to determine a factor score, according to embodiments described herein. In some examples, the scoring module 110 uses the parsed media file 126 and the factor of interest 130 to generate the media distribution 128 at the step 405. The media distribution 128 may include a discrete distribution of each dimension in the factor of interest 130. For example, for each instance of the tags applied to a parsed media file (such as the parsed media file 126 as discussed in relation to FIGS. 2-3B) the media distribution 128 includes an aggregate distribution of the dimension. For example, the factor of interest 130 may include multiple factors of interest, where individual factors make up the dimensions of the factor of interest. In this example, the scoring module 110 processes the media file 122 and applies tags based on the detected dimensions in the media file 122 using any combination of image recognition, ML algorithms, character information, actor information, etc. as described in the parsing of the media file 122 in relation to FIGS. 1-3B. The aggregation of the tags for the for each dimension is shown in Table 1:

TABLE 1

| Dimension | Media Distribution | Reference Distribution |
|---|---|---|
| Dim 1 | 6% | 11% |
| Dim2 | 23% | 10% |
| Dim3 | 15% | 19% |
| Dim4 | 56% | 60% |

In the example shown in Table 1, each dimension (Dim1-Dim4) is a different category or classification detected and tagged by the scoring module 110 in the media file 122 (using the processes discussed in relation to FIGS. 1-3B). The media distribution 128 shown in FIG. 4A includes the four dimensions for the factor of interest (shown as $M_{dim1}$-$M_{dim4}$) where the resulting distribution represents the amount of times a respective tag (and corresponding dimension) was observed in the parsed media file 126, aggregated against a total number of tags for the factor of interest. For example, a first dimension represented by Dim1 is represented by 6% overall in the media file 122. This percentage includes an aggregation of the tags for characters depicted in rendered images, dialogue spoken, among other factor discussed in relation to the parsing instances 220a-n in FIG. 2. A second, third, and fourth dimension are represented by the dimension Dim2-4 respectively in Table 1.

In some examples, for a given number of dimensions (N), the media distribution may be represented by Equation 1.

$$M\{M_{dim1}, M_{dim2}, \ldots M_{dimN}\} \quad \text{Equation 1:}$$

The reference distribution 142, shown in FIG. 4A, includes four dimensions (shown as $R_{dim1}$ through $R_{dim4}$) where the resulting distribution represents the amount of times a respective dimension was observed in the reference dataset. In some examples, for a given number of dimensions (N), the reference distribution 142 may be represented by Equation 2.

The scoring module 110 also uses the reference dataset 140 and the factor of interest 130 to generate the reference distribution 142 at the step 410. In some examples, the reference distribution 142 may include a discrete distribution of each dimension in the factor of interest derived from the reference dataset 140. For example, for each instance of the dimension applied to the parsed media file (as discussed in relation to FIGS. 2-3B) the reference distribution includes an aggregate distribution of the corresponding dimension(s) from the reference dataset.

Referring back to Table 1, each dimension (Dim1 through Dim4) is a different category or classification where the scoring module 110 extracts or tabulates a representation of the racial categories from the reference dataset 140. The reference distribution 142 shown in FIG. 4A includes the four dimensions for the factor of interest (shown as $R_{dim1}$ through $R_{dim4}$) where the resulting distribution represents the amount of times the respective dimension was observed in the reference dataset 140 aggregated against a total number dimensions for the factor of interest. For example, a first dimension represented by Dim1 is represented by 11% overall in the reference dataset 140. This may include the representation of the first dimension in a given population represented by the reference dataset 140. The second, third, and fourth dimension are represented by the dimensions Dim2-4 respectively in Table 1.

$$R\{R_{dim1}, R_{dim2}, \ldots R_{dimN}\} \quad \text{Equation 2:}$$

In some examples, the reference dataset may include demographic information or other information where the dimensions are pre-classified or sorted together (e.g., the reference dataset includes census information including classification for various demographic dimensions). In this example, the scoring module 110 populates the distribution with the data from the reference dataset 140. In another example, the reference dataset 140 may need further processing such as processing raw population data other demographic data, etc. to determine and tabulate the values for each dimension. The scoring module 110 processes the reference dataset 140 to identify, calculate, or aggregate the values for the various dimensions for tracking for the reference distribution 142. Additionally, the reference dataset 140 may include a media library or catalogue, such as the media repository 120 shown in FIG. 1, where the scoring module 110 processes the entire catalogue to provide comparative or relative scores to the media files in the catalogue as discussed in further detail herein.

Upon generation of the media distribution 128 and the reference distribution 142, the scoring module 110 calculates the factor score 112 for the media file 122 in step 415. In some examples, the factor score 112 represents a similarity between the media distribution 128 and the reference distribution 142. In some examples, the step 415 includes processing and normalizing steps where the scoring module 110 continues processing the media distribution 128 and the reference distribution 142 in order to calculate the factor score 112 and better represent the similarity or lack of similarity between the distributions. In some examples, the scoring module 110 also computes multiple scores across each dimension (e.g., for each of Dim1-4 in Table 1) or factor of interest and then aggregates the individual scores into a single factor score, the factor score 112.

In some examples, the scoring module 110 computes a distance between two discrete distributions. For example, for each dimension, the scoring module 110 computes the score between the media distribution 128 and the reference distribution 142. In some examples, the distributions are discrete (e.g., each distribution targets a single factor of interest, where the factor of interest has multiple dimensions for tracking). In this example, the distance between the distributions is expressed in Equation 3.

$$D(M,R) \qquad \text{Equation 3:}$$

$$D(M,R)=D(R,M) \qquad \text{Equation 4:}$$

In some examples, distance metrics such as the distance metric shown in Equation 3 are symmetrical as shown in Equation 4, where the distance between each distribution is symmetrical regardless of the order of operation in performing the distance calculations. However, for the computation of the distance for the factor score 112, the distance metrics are bounded by the scoring module 110, in order to provide a bounded score. In some examples, a bounded score provides an easily interpretable and usable score for both the system 100 and any users which may view the score. For example, the system 100 utilizes a bounded score to perform quality checks and analysis of the scoring processes described herein in order to determine that the methods are performing correctly. In order to provide the bounded distance metrics, the scoring module 110 normalizes the distance calculations, making the distance no longer symmetrical as shown in Equations 5 and 6.

$$DN(M,R)=D(M,R)/\max(m,D(m,R)) \qquad \text{Equation 5:}$$

$$DN(M,R) \neq DN(R,M) \qquad \text{Equation 6:}$$

The normalized distance DN is bounded between value of 0 and 1, but as shown in Equation 6, the normalized distances are not symmetrical between the alternate distance computations. In some examples, the usage of the DN requires careful computation and following a precise order of arguments/calculations by the scoring module 110 in order to provide an accurate factor score. Furthermore, several varying distance functions may be utilized in order to calculate the distance.

For example, the distance may be calculated using a Kullback-Leibler (KL) Divergence. The KL Divergence is standard non-symmetrical solution for computing the distance between two distributions adapted for use in generating the factor score 112. The KL Divergence in the context of the calculation of the factor score may be calculated as shown in Equation 7 (where the dimensions are represented by "i" notation for simplicity in presenting the equations). In some examples, the KL divergence includes relatively flat values for distances. For example, as shown in divergence graph 450 in FIG. 4B, when a reference distribution includes a dimension for a 50% representation of a character of type A and the media distribution includes a 66% representation of type A characters, the KL divergence between two distributions may be relatively flat relative to a KL divergence for 100% (or 0%) type A representation in the media file and 50% type A representation in the media file. For example, KL (50, 50) is 0, KL (66, 50) is −0.05, and KL (100, 50), KL (0, 50) is −0.69. The additional distance calculations herein provide for more varied distances.

$$D(M,R)=KL(M,R)=\text{sum}_i(M_i * \log(M_i/R_i)) \qquad \text{Equation 7:}$$

Another example distance calculation includes utilizing symmetrical absolute difference calculations. In this calculation, for each dimension a penalty value is computed as shown in Equation 8. For example, as shown in distance graph 460 in FIG. 4C for a dimension value for $R_i$ of 1%, the penalty value for various potential $M_i$'s of 1%, 50% and 100% are 0, 0.49, and 0.99 respectively. In another example, for a dimension value for $R_i$ of 50%, the penalty value for various potential $M_i$'s of 1%, 50% and 100% are 0.5, 0, and 0.5 respectively. In another example, for a dimension value for $R_i$ of 80%, the penalty value for various potential $M_i$'s of 1%, 50% and 100% are 0.8, 0.3, and 0.2 respectively. The distance between the distributions is then computed as the sum across all dimensions as shown in Equation 9. A normalization factor is also determined as shown in Equation 10 and applied to the distance function to calculate a normalized distance function in Equation 11. In some examples, the value of X in Equation 11 is "0" for every dimension except for the dimension "j" calculated in equation 10, where the value of X is "1."

$$\text{penalty}(M_i,R_i)=\text{abs}(M_i-R_i). \qquad \text{Equation 8:}$$

$$D(M,R)=\text{sum}_i(\text{abs}(M_i-R_i)) \qquad \text{Equation 9:}$$

$$j=\text{argmin}(R) \qquad \text{Equation 10:}$$

$$DN(M,R)=\text{sum}_i(\text{abs}(M_i-R_i))/\text{sum}_i(\text{abs}(X_i-R_i)) \qquad \text{Equation 11:}$$

For example, referring back to the values presented in Table 1, the symmetrical absolute difference calculations may include the values shown in Tables 2 and 3. In this example, the total absolute difference as calculated in Equation 9 is 0.26, shown in Table 2. Using Dim2 in Equation 10 where j=2 and calculating the total absolute difference using Equation 11=0.14.

TABLE 2

| Dimension | Media Distribution (M) | Reference Distribution (R) | Absolute Difference (Eq. 8) |
|---|---|---|---|
| Dim1 | 0.06 | 0.11 | 0.05 |
| Dim2 | 0.23 | 0.1 | 0.13 |
| Dim3 | 0.15 | 0.19 | 0.04 |
| Dim4 | 0.56 | 0.6 | 0.04 |
| Total | 1 | 1 | 0.26 |

TABLE 3

| Dimension | Lowest case distribution (X) | Reference Distribution (R) | Absolute difference |
|---|---|---|---|
| Dim1 | 0 | 0.11 | 0.11 |
| Dim2 | 1 | 0.1 | 0.9 |
| Dim3 | 0 | 0.19 | 0.19 |
| Dim4 | 0 | 0.6 | 0.6 |
| Total | 1 | 1 | 1.8 |

Another example distance calculation includes utilizing asymmetrical absolute difference calculations. In this example, for each dimension, a linear penalty is computed, as shown in Equation 12, with a minimal value at a reference point, and maximal value on either side of the spectrum (0% and 100%) as shown in distance graph 470 in FIG. 4D with example AD values for $M_i$'s of 1%, 50%, and 80%. The distance between the distributions is computed as the sum across all levels as shown in Equation 13. The normalization factor is obtained when all weight is placed on the level with smallest value as shown in Equation 10, where the normalized distance is calculated using Equation 14. In some examples, the value of X in Equation 15 is "0" for every dimension except for the dimension "j" calculated in equation 10, where the value of is "1."

$$AD(M_i, R_i) = \text{penalty}(M_i, R_i) = \max(R_i - M_i)/R_i, (M_i - R_i)/(1 - R_i)) \quad \text{Equation 12:}$$

$$D(M, R) = \text{sum}_i(AD(M_i, R_i)) \quad \text{Equation 13:}$$

$$DN(M, R) = \text{sum}_i(AD(M_i, R_i))/\text{sum}_i(AD(X_i, R_i)) \quad \text{Equation 14:}$$

In some examples, the above methods for distance calculations can also be further refined using weighted values related to parameters specific to the various dimensions and factors of interest. In any example, once the calculated distance between the media distribution 128 and the reference distribution 142 is used to generate the factor score 112 as shown in Equations 15-17. In Equation 15, the scoring module 110 computes distance across each dimension in the media file 122 (e.g., using any of the methods described above). For example, the scoring module computes a distance for each dimension Dim1 through Dim4 shown in Table 1. The scoring module 110 computes a score across each dimension of the media file using Equation 16, where the scores are scaled from "0" to "100", with "100" being the highest score (i.e. distance of 0) and "0" being a bounded lowest score (e.g., indicating a large distance between the dimensions in the respective distributions). The scoring module 110 also aggregates the dimension-specific scores into a single score, such as the factor score 112, using the Equation 17. For example, using the values calculated above in Tables 2 and 3, the Score (M, R) using equation 16 is 86, where the factor score 112 is further calculated using the aggregate of the dimension scores in Equation 16.

$$DN(M, R) \quad \text{Equation 15:}$$

$$\text{Score}_{dim}(M, R) = 100*(1 - DN(M, R)) \quad \text{Equation 16:}$$

$$\text{Score}(M) = \text{Aggregate}_{dim}(\text{Score}_{dim}(M, R)) \quad \text{Equation 17:}$$

As discussed above, the reference dataset 140 may be a specific dataset for a given region related to a user or population of users. However, content providers may also want to score media files against a catalogue or library of media files instead of external data. In some examples, the scoring module 110 iteratively scores the media file 122 against each catalogue media file and an aggregate score for a media library. This scoring allows content providers to insight into creating new content which differs from everything that has been created in the past in the media catalogue/library. In this example, the scoring module 110 utilizes Equations 18-20 and processes through each media file in a media library (e.g., the media repository 120).

$$\text{Score}_{k\ dim}(M, C_k) = 100*(1 - DN_k(M, C_k)) \quad \text{Equation 18:}$$

$$\text{Score}_k(M, C_k) = \text{Aggregate}_{dim}(\text{Score}_{k\ dim}(M, C_k)) \quad \text{Equation 19:}$$

$$\text{Score}(M) = \text{Aggregate}_k(\text{Score}_k(M, C_k)) \quad \text{Equation 20:}$$

For example, the selected media library is set as $C_k$. The scoring module 110 computes a new title's or media file's distance across each dimension and scores the media file against the selected media library, $C_k$, shown in Equation 18. The scoring module 110 aggregates the dimension-specific scores into a single score for that media file 122 using Equation 19 and aggregates a score for a single file, such as the media file 122, using Equation 20. This process is iteratively repeated for each media file in a media file library or repository to continue updating individual and aggregate scores media files in the library.

The scoring module 110 utilizes any of the various distance calculations to determine/calculate the factor score 112. The calculated factor score 112 is then used by the scoring module 110 to generate a scored action, where the system 100 performs the scored action as described above in relation to FIG. 1.

Figure 5:
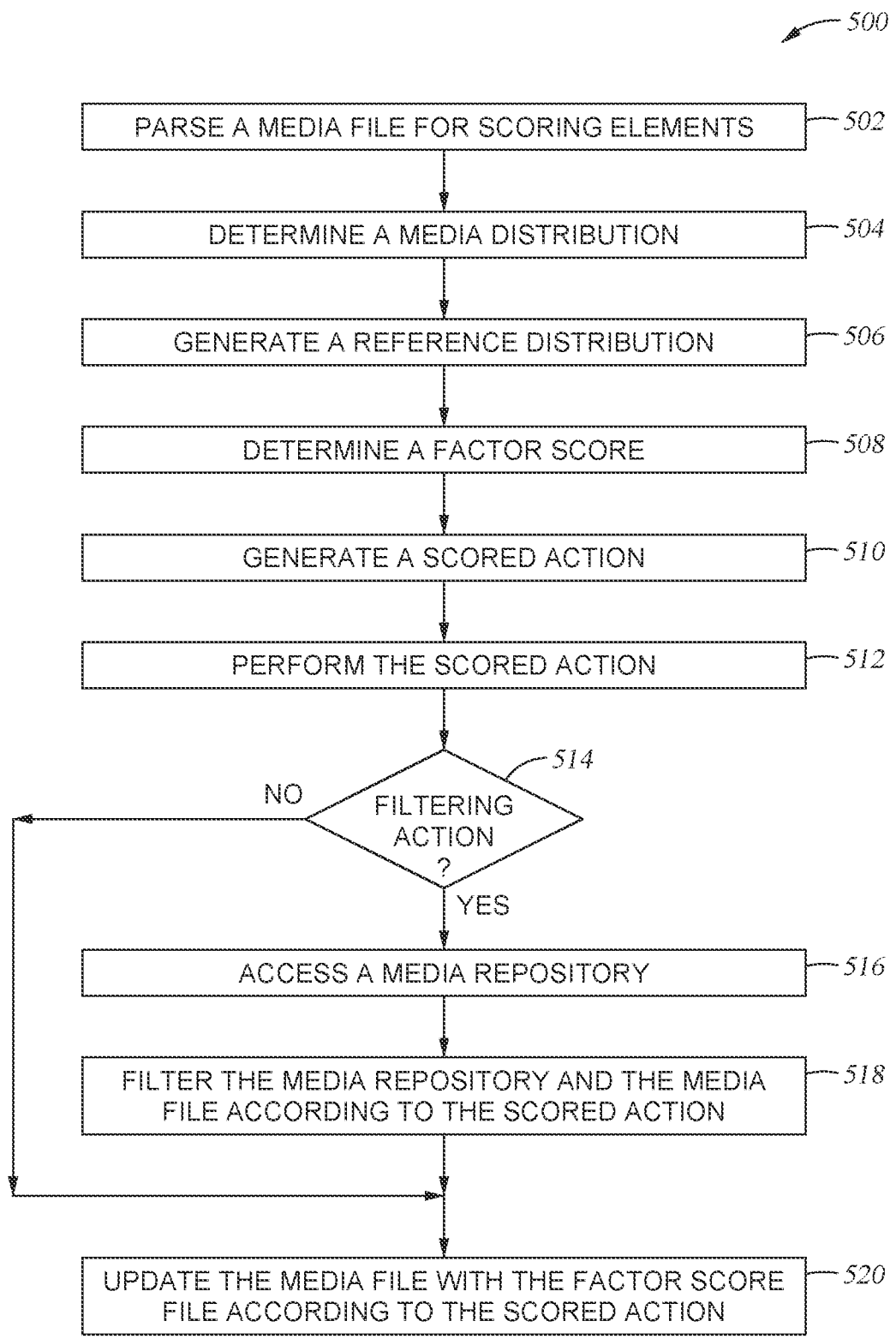
FIG. 5 is flowchart of a method for scoring a media file, according to embodiments described herein.
Figure 6:
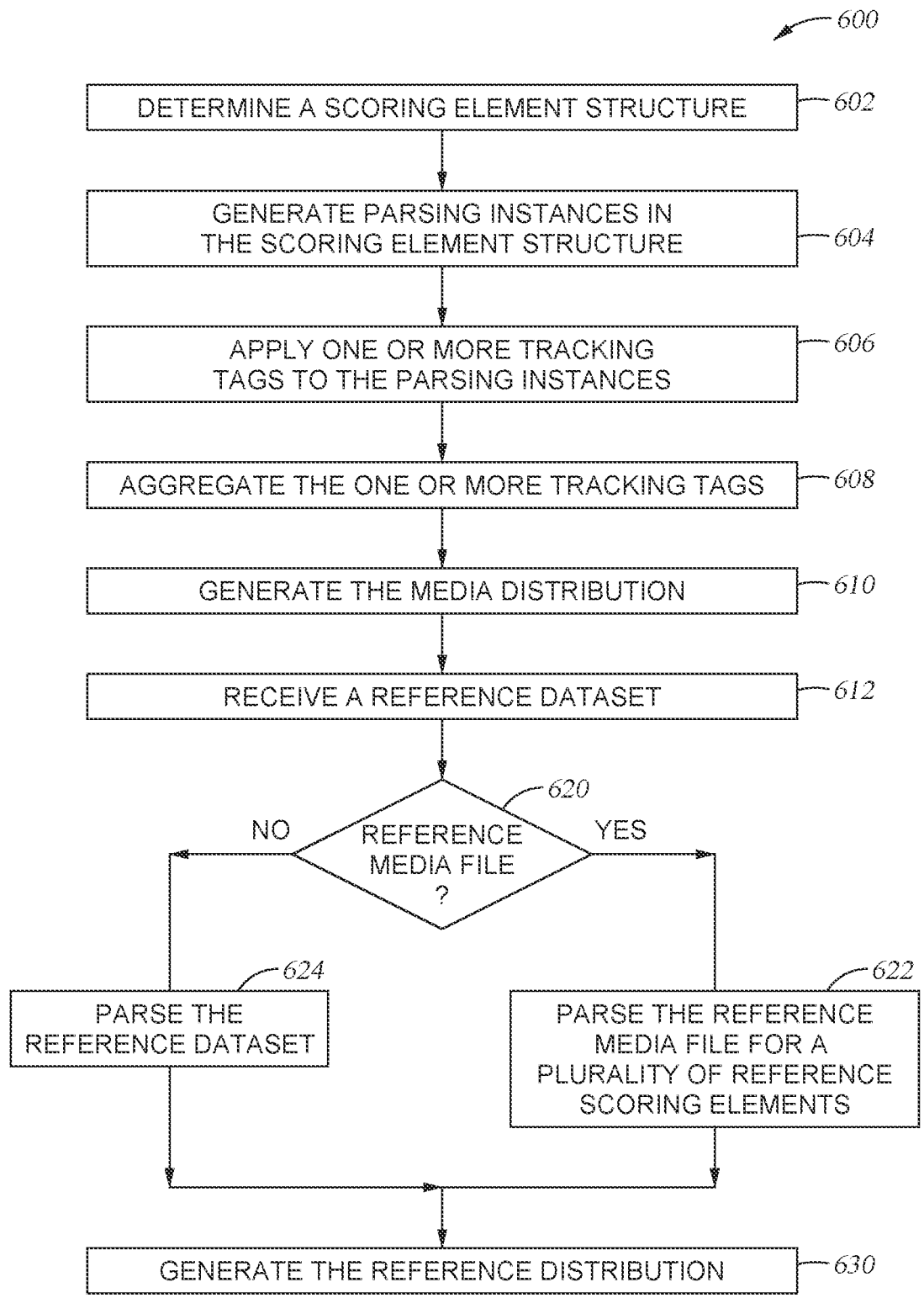
FIG. 6 is flowchart of a method for parsing a media file, according to embodiments described herein.
Figure 7:
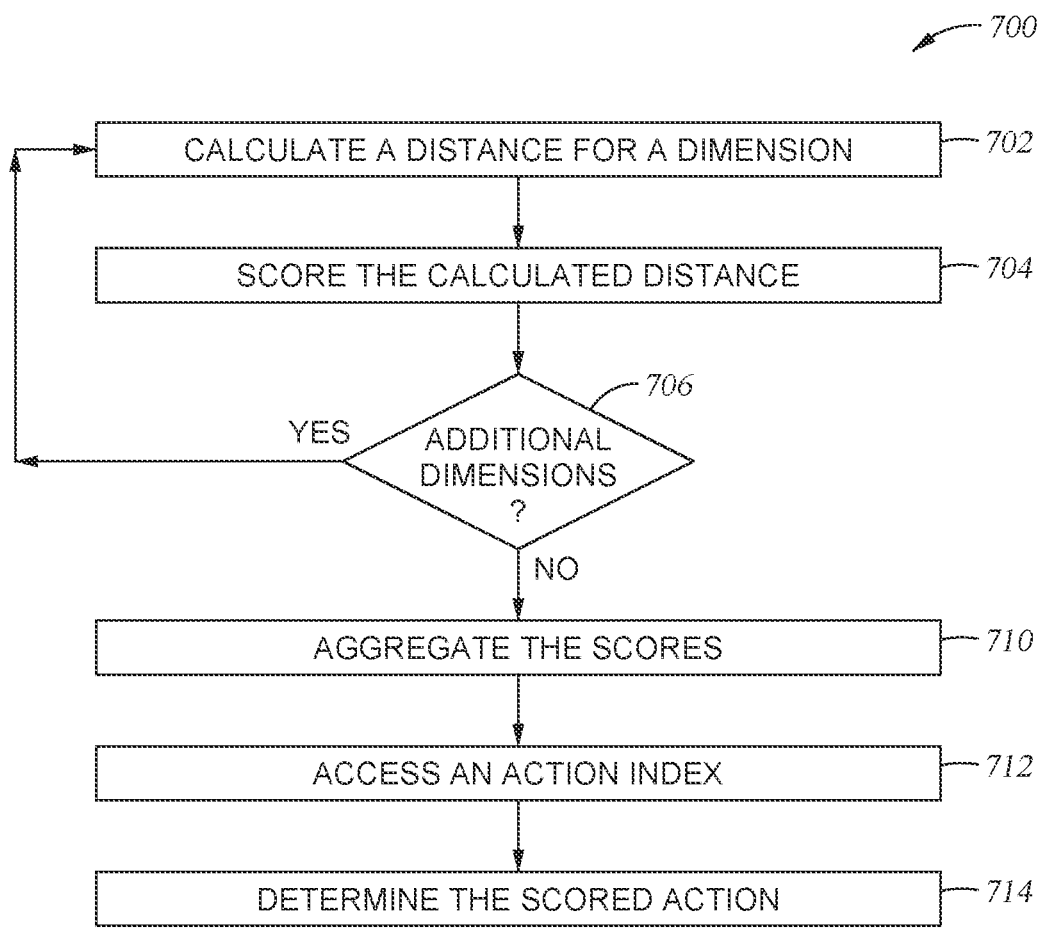
FIG. 7 is flowchart of a method for determining a scored action, according to embodiments described herein.

FIG. 5 is flowchart of a method 500 for scoring a media file, according to embodiments described herein. The methods described in relation to FIGS. 5-7 are performed by the system 100 as shown in the FIG. 1 (including the scoring module 110). A block diagram of system 100 is also described in relation to FIG. 8. For ease of discussion, reference will be made to FIGS. 1-4D throughout the discussion of the methods of FIGS. 5-7. Method 500 begins at block 502 where the system 100 parses a media file for a plurality of scoring elements using a factor of interest. In some examples, the system 100 parses the media file 122 for the plurality of scoring elements, which may include a scoring element structure and various parsing instances as discussed in relation to FIGS. 1-3B. Parsing the media file may also include using the factor of interest to determine a format for the scoring element structure such as the structure or format of the parsing instances, (e.g., the parsing instances 220a-220n). Furthermore, the system 100 may utilize the media dataset 124 to process and form the parsing instances 220a-220n.

In some examples, parsing the media file also includes applying one or more tags to the parsing instances in order to track various dimensions of the factor of interest within the parsing instances (and the media file in general). The parsing and tagging of the media file 122 is discussed in additional detail in relation to the method in FIG. 6.

At block 504, the system 100 determines a media distribution for the media file based on dimensions a presence of the factor of interest in the plurality of scoring elements. For example, the system 100 determines or generates the media distribution 128 described in FIGS. 1 and 4 using the parsed media file 126 (including various parsing instances and applied tags). At block 506, the system 100 generates a reference distribution for the factor of interest based on a presence of the dimensions of the factor of interest in a reference dataset. For example, the system 100 determines or generates the reference distribution 142 described in FIGS. 1 and 4 using the reference dataset 140 (including various data related to the factor of interest).

At block 508, the system 100 determines a factor score for the factor of interest in the media file based on the first distribution and the reference distribution. For example, the system 100 calculates a distance between the media distribution 128 and the reference distribution 142 using any of the methods discussed in relation to FIG. 4A, where the calculated distance is used to determine the factor score for the media file.

At block 510, the system 100 generates a scored action for the media file using the factor score. In some examples, the system 100 utilizes the factor of interest 130, the action index 150, and the factor score 112 to generate or select the scored action 114. As discussed herein the scored action 114 may include any of or a combination of any of: a recommendation action for a user, a filtering content action for a user, a recommendation to a content producer/creator, recommendation for additional content creation, a content warning alert for the media file, recommendation for content score to be provided to a user, recommendation to generate an additional score for the media file for another factor of interest or reference data, etc.

At block 512, the system 100 performs the scored action. In some examples, the scored action may include providing a recommendation or alert to a user or system stakeholder where the system 100 provides the alert to the user system 175 or the media analysis system 165. The system 100 may also perform the various other types of scored actions including the steps described in blocks 514-516.

At block 514, the system 100 determines whether the scored action includes a media filtering action. When the scored action includes a filtering action, method 700 proceeds to block 516, where the system 100 accesses a media repository including the media file and filters the media repository and the media file according to the scored action at block 518. For example, the system 100 filters, updates, reorders, etc. the media repository 120 and the media file 122 based on the scored action 114 and the factor score 112.

In both examples, where the scored action is a filtering action and when the scoring action is not a filtering action, the system 100 updates the media file with the factor score at block 520. For example, the system 100 stores the factor score as metadata for the media file 122, stores the factor score in factor score database for the media repository 120, or otherwise stores the factor score 112 with a correlation to the media file 122 for future use or reference.

FIG. 6 is flowchart of a method 600 for parsing a media file, according to embodiments described herein. Method 600 begins at block 602, where the system 100 determines a scoring element structure for the media file based on the factor of interest and a media type of the media file. For example, the scoring element structure 210, described in FIG. 2, may include a container to collect the various relevant parts or scoring elements of a video content file, including the parsing instances.

At block 604, the system 100 generates at least one parsing instance in the scoring element structure from the media file. In some examples, the types of parsing instances are determined by the scoring module 110 based on the factor of interest 130. In one example, where the factor of interest 130 is related to demographic diversity, the media file 122 is scored based on the representation of the demographic dimensions in the media file, thus the parsing instances for video content may include parsing instances for rendered images and spoken words to capture representation of the demographic dimensions. In another example, the factor of interest 130 relates to other media dimensions, where the media file is scored based on other various other factors. In this case, rendered images may not be necessary for determining the factor score, thus the scoring module 110 does not process the video content for rendered images. In any example, the parsing instances are generated and populated in the scoring element structure in a format that allows for the system 100 to apply tags to the parsing instance structures.

At block 606, the system 100 applies one or more tracking tags to the at least one parsing instance, where the factor of interest includes one or more dimensions. In some examples, the one or more tracking tags track the presence of the one or more dimensions in the parsing structure instances. For example, as shown in FIGS. 3A and 3B, the system 100 applies tags the parsing instances upon detection of the one or more dimensions in the parsing instances.

At block 608, the system 100 aggregates the one or more tracking tags for the at least one parsing instance. For example, the system 100 aggregates a number of tags across the various dimensions for the factor of interest for each parsing instance in the parsed media file 126. At block 610, the system 100 generates the media distribution using the aggregated one or more tracking tags demonstrating the presence of the one or more dimensions in the media file. For example, the system 100 generates the media distribution 128 as described in relation to FIGS. 1, 2, and 4A.

At block 612, the system 100 receives a reference dataset, where the reference dataset includes data representing factors of interest and the one or more dimensions. For example, the system 100 accesses or receives the reference dataset 140 shown in FIGS. 1 and 4A. At block 620, the system 100 determines when the reference dataset is a reference media file or library. For example, when the reference dataset is a media library or catalogue such as the media repository 120, the method 600 proceeds to block 622.

At block 622, the system 100 parses the reference media file for a plurality of reference scoring elements. For example, the system 100 proceeds through a process for iteratively processing and scoring each of the media files in the media repository 120 as described in relation to FIG. 4A (e.g., using Equations 18-20). The system 100 may further aggregate and reprocess the media repository 120 until all media files, including the media file 122, are scored against an aggregate score for the media repository 120.

In an example, where the dataset is not a media library or catalogue, the method 600 proceeds to block 624, where the system 100 parses the reference dataset to tabulate a presence of the one or more dimensions in the reference dataset. In this example, the system 100 parses or extracts the data from the reference dataset 140. In another example, the reference dataset 140 may need further processing such as processing raw population data other demographic data, etc. to determine/tabulate the values for each dimension. The system 100 processes the reference dataset 140 to identify, calculate, or aggregate the values for the various dimensions for tracking for the reference distribution 142. At block 630, the system 100 generates the reference distribution using the presence of the one or more dimensions in the reference dataset. For example, the system 100, using data parsed in block 622 or the block 624, generates the distribution 142 as described in relation to FIG. 4A.

FIG. 7 is flowchart of a method 700 for determining a scored action, according to embodiments described herein. Method 700 begins at block 702, where the system 100 calculates a distance across from the media distribution to the reference distribution for each of the one or more dimensions. For example, for each dimension the in the media distribution 128 and the reference distribution 142, the system 100 calculates a distance using methods and equations discussed in relation to FIG. 4A. The system 100 also scores the distance for each of the one or more dimensions at block 704.

At block 706, the system 100 determines whether additional dimensions remain to be scored. For example, when the factor of interest includes multiple factors or the dimensions of the factor of interests include several discrete dimensions, the system 100 determines when additional dimensions require distance calculations and proceeds back to 702 to calculate a distance for a next dimension. At block 710, the system 100 aggregates the scores to generate the factor score for the media file. For example, the system 100 aggregates the scores for each dimension for each factor or factors of interest.

At block 712 and block 714, the system 100 accesses an action index for one or more action candidates and determines, from the factor of interest and an action request, the scored action from the action candidates. For example, the system 100 may select or generate a scored action from various action candidates including preselected actions or sub-action routines stored in the action index as described in relation to FIG. 1. Upon determining the scored action, the system 100 performs the scored action as described in relation to FIGS. 1 and 5 to advantageously update the media repository 120 and provide various alerts and recommendations to the user 176 and the media analysis system 165.

Figure 8:
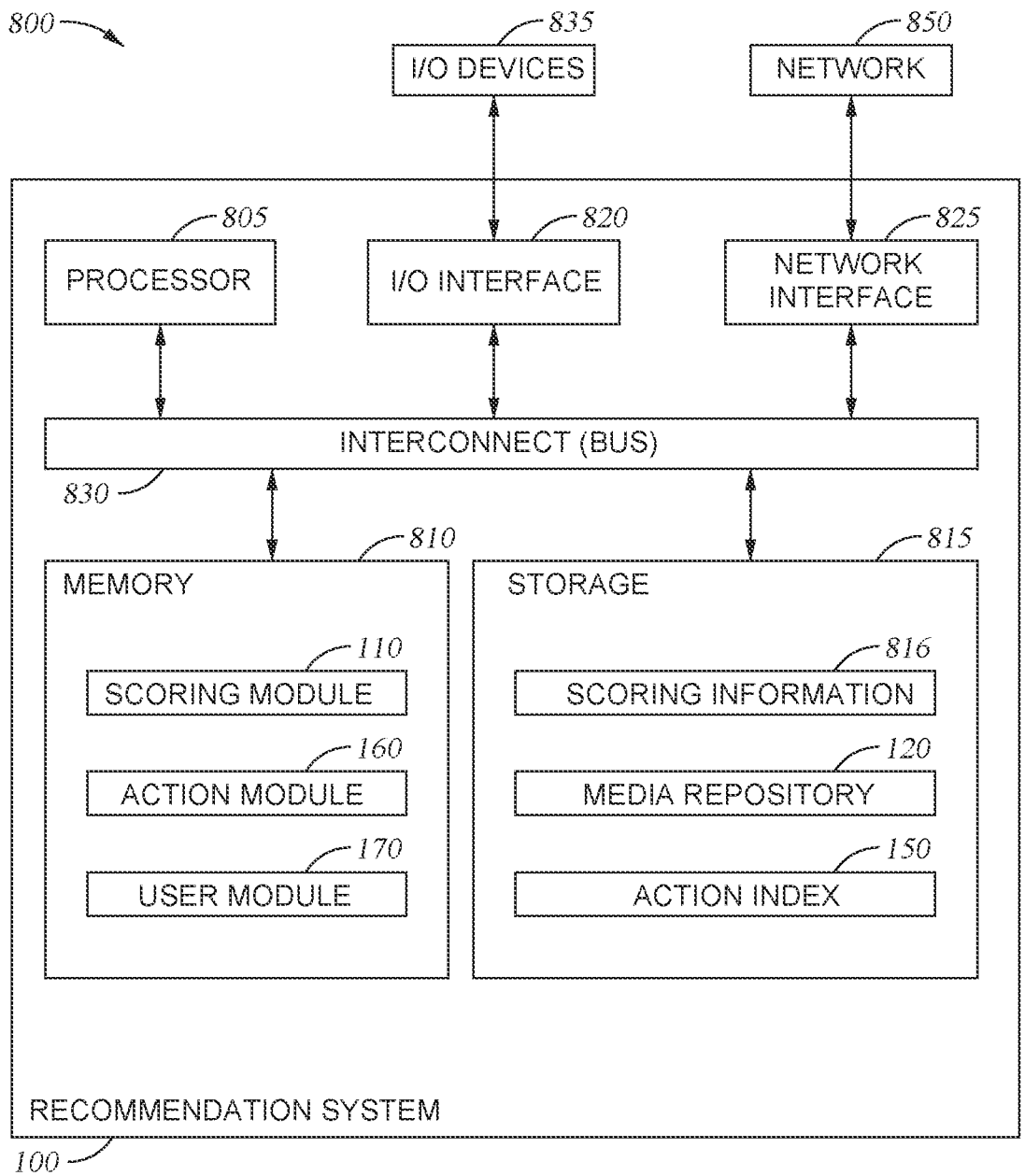
FIG. 8 is a block diagram depicting a recommendation system, according to some embodiments disclosed herein

FIG. 8 is a block diagram depicting the recommendation system, the system 100, in an arrangement 800 configured to parse and score media files using a factor of interest, according to some embodiments disclosed herein. Although depicted as a physical device, in embodiments, the system 100 may be implemented as a virtual device or service, or across a number of devices (e.g., in a cloud environment). As illustrated, the system 100 includes a Processor 805, Memory 810, Storage 815, I/O Interface 820, and a Network Interface 825. The components are connected by one or more Interconnects 830. In the illustrated embodiment, the Processor 805 retrieves and executes programming instructions stored in Memory 810, as well as stores and retrieves application data residing in Storage 815. The Processor 805 is generally representative of a single CPU, a GPU, a CPU and a GPU, multiple CPUs, multiple GPUs, a single CPU or GPU having multiple processing cores, and the like. The Memory 810 is generally included to be representative of a random access memory. Storage 815 may be any combination of memory or storage components, including (but not limited to) disk drives, flash-based storage devices, and the like, and may include fixed storage devices, removable storage devices or a combination both, such as fixed disk drives, removable memory cards, caches, optical storage, network attached storage (NAS), or storage area networks (SAN).

In some embodiments, I/O Devices 835 (such as a mouse, a keyboard, a monitor, a touchscreen, etc.) are connected via the I/O Interface 820. Further, via the Network Interface 825, the System 100 can be communicatively coupled with one or more other devices and components (directly or indirectly), such as content servers, via one or more networks such as a network 850.

In the illustrated embodiment, the Storage 815 includes a set of one or more models and other data such as scoring information 816, media repository 120, and action index 150. Although depicted as residing in Storage 815, the scoring information 816, the media repository 120, and action index 150 may reside in any suitable location. In embodiments, the scoring information 816, media repository 120, and action index 150 are generally used to generate distributions and compute factor scores as described herein. The scoring information 816 may include trained machine learning models, algorithms, sets of scoring rules, and the like.

As illustrated, the Memory 810 includes a scoring module 110, action module 160, and the user module 170. Although depicted as software residing in Memory 810, in embodiments, the functionality of the various modules may be implemented using hardware, software, or a combination of hardware and software. The scoring module 110, action module 160, and the user module 170 is generally configured to perform one or more embodiments disclosed herein. Although depicted as discrete components for conceptual clarity, in embodiments, the operations of the scoring module 110, action module 160, and the user module 170 may be combined or distributed across any number of components.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer-readable storage medium(s) having computer-readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   parsing, by a recommendation computing system, a media file for a plurality of scoring elements using a factor of interest for a first user, wherein the recommendation computing system receives the media file from a content server communicatively coupled to the recommendation computing system through a network;
   determining, by the recommendation computing system, a media distribution of one or more dimensions of the factor of interest for the first user for the media file based on a presence of the one or more dimensions of the factor of interest for the first user in the plurality of scoring elements;
   generating, by the recommendation computing system, a reference distribution of the one or more dimensions of the factor of interest for the first user based on a presence of the one or more dimensions of the of the factor of interest for the first user in a reference dataset;
   determining, by the recommendation computing system, a factor score for the factor of interest for the first user in the media file based on the media distribution and the reference distribution;
   generating, by the recommendation computing system, a scored action for the media file using the factor score; and
   performing, by the recommendation computing system, the scored action by at least filtering a media repository based on the scored action and the factor score by:
      accessing the media repository comprising the media file, wherein the media repository is accessible by the first user through a user system that is communicatively coupled to the recommendation computing system through the network; and
      filtering, by the recommendation computing system according to the scored action, the media repository to change an order of the media file in the media repository, wherein the media repository provides filtered media to the first user through the recommendation computing system, wherein the filtered media is displayed on a display of the user system upon access by the first user.

2. The method of claim 1, wherein parsing, by the recommendation computing system, the media file further comprises:
   determining, by the recommendation computing system, a scoring element structure for the media file based on the factor of interest for the first user and a media type of the media file;
   generating, by the recommendation computing system, at least one parsing instance in the scoring element structure from the media file; and
   applying, by the recommendation computing system, one or more tracking tags to the at least one parsing instance, wherein the one or more tracking tags track the presence of the one or more dimensions in the scoring element structure.

3. The method of claim 2, wherein determining, by the recommendation computing system, the media distribution for the media file further comprises:

aggregating, by the recommendation computing system, the one or more tracking tags for the at least one parsing instance; and generating, by the recommendation computing system, the media distribution using the aggregated one or more tracking tags demonstrating the presence of the one or more dimensions in the media file.

4. The method of claim 3, wherein generating, by the recommendation computing system, the reference distribution for the factor of interest for the first user further comprises:

receiving, at the recommendation computing system, the reference dataset, wherein the reference dataset comprises data representing factors of interest and the one or more dimensions; and parsing, by the recommendation computing system, the reference dataset to tabulate the presence of the one or more dimensions in the reference dataset; and generating, by the recommendation computing system, the reference distribution using the presence of the one or more dimensions in the reference dataset.

5. The method of claim 4, wherein determining, by the recommendation computing system, the factor score comprises:

calculating, by the recommendation computing system, a distance across from the media distribution to the reference distribution for each of the one or more dimensions;

scoring, by the recommendation computing system, the distance for each of the one or more dimensions; and aggregating, by the recommendation computing system, the scores to generate the factor score for the media file.

6. The method of claim 1, wherein generating, by the recommendation computing system, the scored action further comprises:

accessing, by the recommendation computing system, an action index for one or more action candidates; and determining, by the recommendation computing system, from the factor of interest for the first user, the scored action from the action candidates.

7. A system, comprising:

a processor; and a memory comprising instructions which, when executed on the processor, performs an operation, the operation comprising:

parsing, by a recommendation computing system, a media file for a plurality of scoring elements using a factor of interest for a first user, wherein the recommendation computing system receives the media file from a content server communicatively coupled to the recommendation computing system through a network;

determining, by the recommendation computing system, a media distribution of one or more dimensions of the factor of interest for the first user for the media file based on a presence of the one or more dimensions of the factor of interest for the first user in the plurality of scoring elements;

generating, by the recommendation computing system, a reference distribution of the one or more dimensions of the factor of interest for the first user based on a presence of the one or more dimensions of the of the factor of interest for the first user in a reference dataset;

determining, by the recommendation computing system, a factor score for the factor of interest for the first user in the media file based on the media distribution and the reference distribution;

generating, by the recommendation computing system, a scored action for the media file using the factor score; and performing, by the recommendation computing system, the scored action by at least filtering a media repository based on the scored action and the factor score by:

accessing the media repository comprising the media file, wherein the media repository is accessible by the first user through a user system that is communicatively coupled to the recommendation computing system through the network; and filtering, by the recommendation computing system according to the scored action, the media repository to change an order of the media file in the media repository, wherein the media repository provides filtered media to the first user through the recommendation computing system, wherein the filtered media is displayed on a display of the user system upon access by the first user.

8. The system of claim 7, wherein parsing, by the recommendation computing system, the media file further comprises:

determining, by the recommendation computing system, a scoring element structure for the media file based on the factor of interest for the first user and a media type of the media file;

generating, by the recommendation computing system, at least one parsing instance in the scoring element structure from the media file; and applying, by the recommendation computing system, one or more tracking tags to the at least one parsing instance, wherein the one or more tracking tags track the presence of the one or more dimensions in the scoring element structure.

9. The system of claim 8, wherein determining, by the recommendation computing system, the media distribution for the media file further comprises:

aggregating, by the recommendation computing system, the one or more tracking tags for the at least one parsing instance; and generating, by the recommendation computing system, the media distribution using the aggregated one or more tracking tags demonstrating the presence of the one or more dimensions in the media file.

10. The system of claim 9, wherein generating, by the recommendation computing system, the reference distribution for the factor of interest for the first user further comprises:

receiving, at the recommendation computing system, the reference dataset, wherein the reference dataset comprises data representing factors of interest and the one or more dimensions; and parsing, by the recommendation computing system, the reference dataset to tabulate the presence of the one or more dimensions in the reference dataset; and generating, by the recommendation computing system, the reference distribution using the presence of the one or more dimensions in the reference dataset.

11. The system of claim 9, wherein determining, by the recommendation computing system, the factor score comprises:

calculating, by the recommendation computing system, a distance across from the media distribution to the reference distribution for each of the one or more dimensions;

scoring, by the recommendation computing system, the distance for each of the one or more dimensions; and aggregating, by the recommendation computing system, the scores to generate the factor score for the media file.

12. The system of claim 7, wherein generating, by the recommendation computing system, the scored action further comprises:

accessing, by the recommendation computing system, an action index for one or more action candidates; and determining, by the recommendation computing system, from the factor of interest for the first user, the scored action from the action candidates.

13. A non-transitory computer-readable storage medium comprising computer-readable program code embodied therewith, the computer-readable program code is configured to perform, when executed by a processor, an operation, the operation comprising:

parsing, by a recommendation computing system, a media file for a plurality of scoring elements using a factor of interest for a first user, wherein the recommendation computing system receives the media file from a content server communicatively coupled to the recommendation computing system through a network;

determining, by the recommendation computing system, a media distribution of one or more dimensions of the factor of interest for the first user for the media file based on a presence of the one or more dimensions of the factor of interest for the first user in the plurality of scoring elements;

generating, by the recommendation computing system, a reference distribution of the one or more dimensions of the factor of interest for the first user based on a presence of the one or more dimensions of the of the factor of interest for the first user in a reference dataset;

determining, by the recommendation computing system, a factor score for the factor of interest for the first user in the media file based on the media distribution and the reference distribution;

generating, by the recommendation computing system, a scored action for the media file using the factor score; and performing, by the recommendation computing system, the scored action by at least filtering a media repository based on the scored action and the factor score by:

accessing the media repository comprising the media file, wherein the media repository is accessible by the first user through a user system that is communicatively coupled to the recommendation computing system through the network; and filtering, by the recommendation computing system according to the scored action, the media repository to change an order of the media file in the media repository, wherein the media repository provides filtered media to the first user through the recommendation computing system, wherein the filtered media is displayed on a display of the user system upon access by the first user.

14. The computer-readable storage medium of claim 13, wherein parsing, by the recommendation computing system, the media file further comprises:

determining, by the recommendation computing system, a scoring element structure for the media file based on the factor of interest for the first user and a media type of the media file;

generating, by the recommendation computing system, at least one parsing instance in the scoring element structure from the media file; and applying, by the recommendation computing system, one or more tracking tags to the at least one parsing instance, wherein the one or more tracking tags track the presence of the one or more dimensions in the scoring element structure.

15. The computer-readable storage medium of claim 14, wherein determining, by the recommendation computing system, the media distribution for the media file further comprises:

aggregating, by the recommendation computing system, the one or more tracking tags for the at least one parsing instance; and generating, by the recommendation computing system, the media distribution using the aggregated one or more tracking tags demonstrating the presence of the one or more dimensions in the media file.

16. The computer-readable storage medium of claim 15, wherein generating, by the recommendation computing system, the reference distribution for the factor of interest for the first user further comprises:

receiving, at the recommendation computing system, the reference dataset, wherein the reference dataset comprises data representing factors of interest and the one or more dimensions; and parsing, by the recommendation computing system, the reference dataset to tabulate the presence of the one or more dimensions in the reference dataset; and generating, by the recommendation computing system, the reference distribution using the presence of the one or more dimensions in the reference dataset.

17. The computer-readable storage medium of claim 16, wherein determining, by the recommendation computing system, the factor score comprises:

calculating, by the recommendation computing system, a distance across from the media distribution to the reference distribution for each of the one or more dimensions;

scoring, by the recommendation computing system, the distance for each of the one or more dimensions; and aggregating, by the recommendation computing system, the scores to generate the factor score for the media file.

18. The computer-readable storage medium of claim 13, wherein generating, by the recommendation computing system, the scored action further comprises:

accessing, by the recommendation computing system, an action index for one or more action candidates; and determining, by the recommendation computing system, from the factor of interest for the first user, the scored action from the action candidates.

* * * * *